United States Patent
Richards et al.

(10) Patent No.: US 9,958,693 B2
(45) Date of Patent: *May 1, 2018

(54) SYSTEM FOR 3D IMAGE PROJECTIONS AND VIEWING

(71) Applicant: Dolby Laboratories Licensing Corporation, San Francisco, CA (US)

(72) Inventors: Martin J. Richards, Redwood City, CA (US); Wilson Allen, Mill Valley, CA (US); Gary D Gomes, Union, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/295,124

(22) Filed: Jun. 3, 2014

(65) Prior Publication Data

US 2014/0285770 A1    Sep. 25, 2014

Related U.S. Application Data

(63) Continuation of application No. 13/942,455, filed on Jul. 15, 2013, now abandoned, which is a
(Continued)

(51) Int. Cl.
*G02B 27/22* (2006.01)
*G02B 5/28* (2006.01)
(Continued)

(52) U.S. Cl.
CPC ......... *G02B 27/2228* (2013.01); *G02B 5/285* (2013.01); *G02B 26/008* (2013.01);
(Continued)

(58) Field of Classification Search
CPC .......... H04N 13/0429; H04N 13/0431; G02B 5/286–5/288; G02B 27/2207
(Continued)

(56) References Cited

U.S. PATENT DOCUMENTS 1,986,966 A    1/1935  Godwin
1,993,272 A    3/1935  Godwin
(Continued)

FOREIGN PATENT DOCUMENTS

CN    2045120      9/1989
DE    19808264    11/1998
(Continued)

*Primary Examiner* — Audrey Y Chang

(57) ABSTRACT

Shaped glasses have curved surface lenses with spectrally complementary filters disposed thereon. The filters curved surface lenses are configured to compensate for wavelength shifts occurring due to viewing angles and other sources. Complementary images are projected for viewing through projection filters having passbands that pre-shift to compensate for subsequent wavelength shifts. At least one filter may have more than 3 primary passbands. For example, two filters include a first filter having passbands of low blue, high blue, low green, high green, and red, and a second filter having passbands of blue, green, and red. The additional passbands may be utilized to more closely match a color space and white point of a projector in which the filters are used. The shaped glasses and projection filters together may be utilized as a system for projecting and viewing 3D images.

14 Claims, 15 Drawing Sheets

Related U.S. Application Data continuation of application No. 12/530,379, filed as application No. PCT/US2008/006007 on May 9, 2008, now abandoned, which is a continuation of application No. 11/804,602, filed on May 18, 2007, now Pat. No. 7,959,295, and a continuation of application No. 11/801,574, filed on May 9, 2007, now Pat. No. 7,784,938.

(60) Provisional application No. 60/931,320, filed on May 21, 2007.

(51) Int. Cl.
    *G02B 26/00*     (2006.01)
    *H04N 13/04*     (2006.01)

(52) U.S. Cl.
    CPC ......... *G02B 27/22* (2013.01); *H04N 13/0422* (2013.01); *H04N 13/0431* (2013.01); *H04N 13/0459* (2013.01)

(58) Field of Classification Search
    USPC ....... 359/462, 464, 466, 587, 588, 589, 581; 353/7
    See application file for complete search history.

(56) References Cited

U.S. PATENT DOCUMENTS

| | | |
|---|---|---|
| 3,962,062 A | 6/1976 | Ingrey |
| 4,134,644 A | 1/1979 | Marks |
| 4,189,210 A | 2/1980 | Browning |
| 4,247,177 A | 1/1981 | Marks |
| 4,431,265 A | 2/1984 | Benton |
| 4,705,356 A | 11/1987 | Berning |
| 4,705,371 A | 11/1987 | Beard |
| 4,740,836 A | 4/1988 | Dwin |
| 4,914,510 A | 4/1990 | Brennesholtz |
| 4,937,134 A | 6/1990 | Schrenk |
| 4,965,135 A | 10/1990 | Im |
| 5,140,464 A * | 8/1992 | Kyogoku et al. ............. 359/588 |
| 5,218,386 A | 6/1993 | Levien |
| 5,260,773 A | 11/1993 | Dischert |
| 5,537,476 A | 7/1996 | Coteus |
| 5,614,920 A | 3/1997 | Coteus |
| 5,619,219 A | 4/1997 | Coteus |
| 5,867,316 A | 2/1999 | Carlson |
| 6,142,624 A | 11/2000 | Morris |
| 6,175,371 B1 | 1/2001 | Schoulz |
| 6,242,752 B1 | 6/2001 | Soma |
| 6,283,597 B1 | 9/2001 | Jorke |
| 6,698,890 B1 | 3/2004 | Jorke |
| 6,777,070 B1 | 8/2004 | Murata |
| 6,847,483 B2 | 1/2005 | Lippey |
| 6,850,352 B1 | 2/2005 | Childers |
| 6,867,775 B2 | 3/2005 | Buck |
| 6,943,852 B2 | 9/2005 | Divelbiss |
| 7,001,021 B2 * | 2/2006 | Jorke ................................. 353/7 |
| 7,136,210 B2 | 11/2006 | Harper |
| 7,164,535 B2 * | 1/2007 | Hall et al. ..................... 359/581 |
| 7,273,282 B2 | 9/2007 | Przybyla |
| 7,602,108 B2 | 10/2009 | Shelby |
| 7,636,193 B2 | 12/2009 | Bellanca |
| 7,686,455 B2 | 3/2010 | Yoshimura |
| 7,784,938 B2 | 8/2010 | Richards |
| 7,832,869 B2 | 11/2010 | Maximus |
| 7,959,295 B2 | 6/2011 | Richards |
| 7,995,092 B2 | 8/2011 | Lippey |
| 8,411,137 B2 | 4/2013 | Jacobs |
| 8,459,796 B2 * | 6/2013 | Richards ............ G02B 27/2207 351/159.65 |
| 8,503,078 B2 * | 8/2013 | Richards ............ G02B 27/2207 359/464 |
| 8,537,463 B2 * | 9/2013 | Richards ............ G02B 27/2207 359/464 |
| 2003/0086601 A1 | 5/2003 | Lee |
| 2004/0233524 A1 | 11/2004 | Lippey |
| 2005/0036119 A1 | 2/2005 | Ruda |
| 2005/0225630 A1 | 10/2005 | Childers |
| 2005/0231800 A1 | 10/2005 | Lippey |
| 2006/0011617 A1 | 1/2006 | Covarrubias |
| 2007/0127121 A1 | 6/2007 | Maximus |
| 2007/0236617 A1 | 10/2007 | Lippey |
| 2007/0236809 A1 | 10/2007 | Lippey |
| 2007/0247709 A1 | 10/2007 | Karakawa |
| 2008/0151193 A1 | 6/2008 | Reder |
| 2008/0158672 A1 | 7/2008 | McCosky |
| 2008/0278574 A1 | 11/2008 | Ramstad |
| 2010/0066813 A1 | 3/2010 | Jorke |

FOREIGN PATENT DOCUMENTS

| | | |
|---|---|---|
| DE | 10057102 | 5/2002 |
| DE | 10249815 | 5/2004 |
| DE | 10359788 | 4/2005 |
| EP | 0123748 | 11/1984 |
| EP | 2116067 | 11/2009 |
| JP | S62-103602 | 5/1987 |
| JP | 62-254594 | 11/1987 |
| JP | 1116521 | 5/1989 |
| JP | H01-116521 | 5/1989 |
| JP | 02-078393 | 3/1990 |
| JP | H04-324447 | 11/1992 |
| JP | H09-503402 | 4/1997 |
| JP | 2001-326949 | 11/2001 |
| JP | 2003-264853 | 9/2003 |
| JP | 2004-333561 | 11/2004 |
| JP | 2006-235332 | 9/2006 |
| KR | 10-1987-0001837 | 10/1987 |
| KR | 20-1996-0006160 | 7/1996 |
| KR | 10-2002-0050042 | 6/2002 |
| KR | 10-2010-0445898 | 8/2004 |
| KR | 10-2005-0102282 | 10/2005 |
| RU | 2132115 | 6/1999 |
| WO | 1998/049837 | 11/1998 |
| WO | 01/11894 | 2/2001 |
| WO | 2004/105380 | 12/2004 |
| WO | 2005/039192 | 4/2005 |
| WO | 2005/099279 | 10/2005 |
| WO | 2007/008109 | 1/2007 |
| WO | 2007/118114 | 10/2007 |
| WO | 2008/061511 | 5/2008 |

* cited by examiner

SYSTEM FOR 3D IMAGE PROJECTIONS AND VIEWING

CROSS REFERENCE TO RELATED APPLICATIONS

This application is a continuation of U.S. patent application Ser. No. 13/942,455 filed on Jul. 15, 2013, which is a continuation of U.S. patent application Ser. No. 12/530,379 filed on Sep. 8, 2009, which is a national application of PCT application PCT/US2008/006007 filed on May 9, 2008 which claims the benefit of the filing date of U.S. Provisional Patent Application Ser. No. 60/931,320 filed on May 21, 2007. PCT application PCT/US2008/006007 is a continuation of U.S. patent application Ser. No. 11/804,602 filed on May 18, 2007 now is issued as U.S. Pat. No. 7,959,295. PCT application PCT/US2008/006007 also is a continuation of U.S. patent application Ser. No. 11/801,574 filed on May 9, 2007 now is issued as U.S. Pat. No. 7,784,938, all of which are hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates viewing systems and products for projecting and viewing spectrally separated 3-Dimensional (3D) images. The invention is also related to viewing systems used in a Digital Cinema (D-Cinema) Theatre and improves current methods for projecting and viewing a 3D stereoscopic movie.

BACKGROUND ART

Methods for 3D stereoscopic projection include Anaglyph, Linear Polarization, Circular Polarization, Shutter Glasses, and Spectral Separation. Anaglyph is the oldest technology, and provides left/right eye separation by filtering the light through a two color filter, commonly red for one eye, and cyan for the other eye. At the projector, the left eye image is (commonly) filtered through a red filter, and the right image filtered through a cyan filter. The eyewear includes, for example, a red filter for the left eye, and a cyan filter for the right eye. This method works best for black and white original images, and is not well suited for color images.

Linear Polarization 3D provides separation at the projector by filtering the left eye through a linear polarizer (commonly) oriented vertically, and filtering the right eye image through a linear polarizer oriented horizontally. The eyewear includes a vertically oriented linear polarizer for the left eye and a horizontally oriented polarizer for the right eye. The projection screen must be of the polarization preserving type, commonly referred to as a "silver screen" because of its distinctive color. Linear Polarization allows a full color image to be displayed with little color distortion. It has several problems, these include the need for a silver screen which is expensive, fragile, and not uniform. Another problem is that the viewer must keep his head oriented vertically to avoid crosstalk from one eye to another.

Circular Polarization 3D was invented to address the problem of requiring the viewer to keep his head oriented vertically. Circular Polarization provides separation at the projector by filtering the left eye image through a (commonly) left handed circular polarizer, and filtering the right eye image through a right handed circular polarizer. The eyewear includes a left handed circular polarizer for the left eye and a right handed circular polarizer for the right eye. A silver screen is also needed for this approach. Shutter Glasses provides separation by multiplexing the left and right images in time. A filter for separation at the projector is not required. The eyewear includes Shutter Glasses. These are active glasses that electronically shutter the lens in synchrony with the projector frame rate. The left eye image is first displayed, followed by the right eye image etc. Since having a direct wired connection to the Glasses in a theatre is impractical, a wireless or infrared signaling method is used to provide a timing reference for the left/right eye shuttering. This method requires an IR or RF transmitter in the auditorium. The Shutter Glasses are expensive and hard to clean, require batteries that must be frequently replaced, and are limited in their switching rate. Shutter glasses are only practical for use with D-Cinema or other electronic projection systems since very few film projectors provide the signal required to synchronize the shutter glasses with the frame rate. The method does not require a silver screen.

Spectral Separation provides separation at the projector by filtering the left and right eye spectrally. The system differs from anaglyph in that the filters for the left and right eye each pass a portion of the red, green, and blue spectrum, providing for a full color image. The band pass spectrum of the left eye filter is complementary to the band pass spectrum of the right eye filter. The eyewear includes filters with the same general spectral characteristics as are used in the projector. While this method provides a full color image, it requires color compensation to make the colors in the left and right eye match the colors that were present in the original image, and there is a small reduction in the color gamut compared to the gamut of the projector.

All of the above methods for providing left/right eye separation for a 3D Stereoscopic presentation can be used with either two projectors (one for the left eye and one for the right eye), or may be used with a single D-Cinema projector system. In the dual projection system, the projection filter is usually static, and is located in front of the projection lens. In a single D-Cinema projector system, the left and right images are time multiplexed. Except for the Shutter Glasses case where no projection filters are required, this means that the projection filters must change at the L/R multiplex frequency. This can be done with either a filter wheel in the projector synchronized to the multiplex frequency, or with an electronically switched filter.

DISCLOSURE OF THE INVENTION

The present inventors have realized the need for improvements in spectrally separated viewing devices and systems. The invention provides several techniques to remove and compensate for blue shift that occurs when viewing images through filters at off-axis (other than normal) angles. The blue shift is undesirable because it can result in crosstalk between left and right images in a 3D image presentation.

The present inventors have also realized the need for improvements in spectral separation filters, and particularly those used in 3D D-Cinema applications. One problem realized is that typical 3-D projection systems have low luminance efficiency in that color spaces, color gamut, and effective brightness are inadequate. Another problem realized is that imbalance between luminance levels in channels of 3D projections decreases luminal efficiency. Accordingly, as described in more detail below, the present invention also provides techniques to increase the color space and luminal efficiency of projected images that may be used alone or in combination with blue shift compensation techniques.

The present invention includes one or more techniques to increase the color space of spectrally separated images which may be combined with one or more techniques to compensate for blue shift that occurs when viewing spectrally separated images through filters at other than normal angles. The individual techniques are further described herein. When utilized together, the invention is a system comprising a 3D projection device using asymmetric projection filters and viewing glasses comprising non-flat lenses with spectrally complimentary filters.

Generally described, in one embodiment, the present invention provides a pair of 3D spectral separation filters (eye filters), disposed on left and right lenses of a pair of viewing glasses, the eye filters comprising a combination of increased (and proportional to wavelength) guard bands, and appropriately curved lenses to reduce crosstalk, color shift, and reflections at the edge of the field of view. A blue shifted color filter in a
—A—projector that projects images for viewing through the glasses may also be utilized. Although the present invention encompasses a combination of improvements to viewing glasses and preparation of images for viewing (e.g., image projection), the invention may be practiced with less than all the improvements in combination. In one embodiment, the present invention comprises viewing filters comprising a non-flat substrate and spectrally complementary filters.

In one embodiment, the present invention provides spectral separation viewing glasses, comprising, a first lens having a first spectral filter, and a second lens having a second spectral filter complementary to the first spectral filter, wherein the first lens and the second lens are each curved to reduce the wavelength shift that occurs when viewing an image at other than an angle normal to a filter through which the image is being viewed. An amount of curvature of the lenses (and hence the filters) is calculated such that viewing angles across a viewing screen are closer to normal angles through the lenses. The curvature is implemented, for example, as a spherical curve. In another embodiment, the invention is embodied as spectral separation viewing glasses, comprising, a first lens comprising a first spectral filter, and a second lens comprising a second spectral filter complementary to the first spectral filter, wherein the first spectral filter and the second spectral filter have at least one guard band between adjacent portions of spectrum of the spectral filters. The guard band has a bandwidth sufficient to remove crosstalk of spectrally separated images viewed through the glasses, and, for example, is calculated based on an amount of wavelength shift occurring when viewing portions of the spectrally separated images at an angle through the filters.

In one embodiment, the present invention provides a spectral separation viewing system, comprising, viewing glasses having both curved lenses and increased guard bands, and a projection system configured to project first and second spectrally separated images wherein the images are wavelength pre-shifted to compensate for wavelength shifts occurring during display and/or viewing of the images. Such systems are preferably implemented in a commercial movie theater, but are also applicable to large screen televisions, computers, virtual reality systems, and other display devices. The present invention includes a method, comprising the steps of, projecting first and second spectrally separated images onto a display screen, viewing the projected images through a pair of glasses having a first lens having a first spectral filter matching the first spectrally separated image and a second lens having a second spectral filter matching the second spectrally separated image, wherein the spectral filters are
configured to have a varying amount of wavelength shift effect depending upon a viewing angle through the lens.

In one embodiment, the present invention is a 3D viewing system, comprising, means for projecting spectrally separated images, means for viewing the spectrally separated images through different ocular channels, and means for compensating for wavelength shifts occurring due to viewing angles to portions of the images. The means for compensating may include, for example, means for adjusting an amount of spectral filtering performed on different portions of the image based on viewing angle. The means for compensating includes, for example, means for producing a wavelength mismatch between projector filters and eye filters that compensates for an amount of wavelength shift that occurs in the eye filters due to viewing angle.

The present invention may also be described as shaped glasses, comprising a pair of spectrally complementary filters disposed on curved lenses of the glasses. The spectrally complementary filters may include guard bands between adjacent spectrums of the spectrally complementary filters. In one embodiment, the thickness of dielectric layers of the spectrally complementary filters increases toward edges of the lenses.

The present invention includes a method, comprising the steps of, distributing shaped glasses to audience viewers, and projecting first and second spectrally complementary images on a display screen within view of the audience members, wherein the shaped glasses comprise first and second shaped lenses having first and second spectrally complementary filters respectively disposed thereon. In one embodiment, the first and second spectrally complementary filters respectively correspond in bandwidth to the projected first and second spectrally complementary images. However, the filters are not necessarily required to correspond exactly with the projected images of the filters. The shaped glasses comprise, for example, spherically shaped lenses.

The present invention includes a storage medium having at least a visual performance stored thereon, that, when loaded into a media player coupled to a display device, causes the media player to transmit the visual performance for display to the display device; wherein the visual performance as displayed on the display device is configured for viewing through a pair of shaped glasses. The storage medium is, for example, prepackaged with at least one pair of shaped glasses and available for purchase via a retail outlet.

In yet another embodiment, the present invention is a system for viewing 3D images, comprising, serving 3D content over a network to a receiving electronic device, and displaying the 3D content, wherein the 3D content comprises spectrally complementary images intended to be viewed with spectrally separated shaped glasses. The receiving electronic device is, for example, a display system located at a movie theater.

The present invention addresses some of the problems with the Spectral Separation method for projecting 3D images, specifically an improvement in the efficiency, increase in the color gamut, and a reduction in the amount of color compensation required. In some cases, the color compensation may not be required. The present invention addresses the efficiency and color space issues by splitting primary colors of the projector into subparts. The splitting of primary colors into subparts is accomplished in part through the filter installed in the projector, which is the main controlling factor in the color space of the system. The efficiency and color gamut of the projected image are both increased using the additional subparts of the split primary colors.

In one embodiment, the present invention provides a projector filter, comprising, a first filter having a first set of primary passbands, and a second filter having a second set of primary passbands, wherein the first set of primary passbands has a different number of primary passbands than the second filter. The first filter has, for example, at least two blue primary passbands and the second filter has at least one blue primary passband. The first filter may also have, for example, at least two green primary passbands and the second filter has at least one green primary. For example, the first filter may have passband wavelengths of approximately 400 to 440 nm and 484 to 498 nm, 514 to 528 nm, 567 to 581 nm, and 610 to 623 nm, and the second filter may have passband wavelengths of approximately 455 to 471 nm, 539 to 556 nm, and 634 to 700 nm. The passbands of the first filter and the second filter are, for example, selected to maximize reproduction of a color space of a D-Cinema projector.

The present invention may also be realized as a system for projection of spectrally separated 3D images, comprising, a projection system configured to project left and right channel images for display by a viewer, a filter placed in at least one light path of the projection system comprising a left channel filter and a right channel filter, wherein at least one of the left and right channel filters has more than 3 primary passbands. In one embodiment, one of the left and right channel filters has at least 2 primary passbands in blue wavelengths and one of the left and right channel filters has at least 2 primary passbands in green wavelengths. Again, the primary passbands of the filters are selected to maximize reproduction of a color space of the projection system in images projected by the projection system. The system may include, for example, a color correction module configured to color correct images projected by the projection system according to a color space of the filters.

The invention may also be embodied as a set of filters, comprising a first filter having a first set of primary color passbands, a second filter having a second set of primary color passbands of different wavelengths compared to the first set of primary colors, wherein the first filter has more than one primary color in at least one color band.

The present invention may also be embodied as a method, comprising the steps of, preparing a 3D image comprising a left image and a right image, filtering the left image with a left channel filter, filtering the right image with a right channel filter, and projecting the left and right filtered images onto a screen, wherein at least one of the left channel filter and right channel filter have more than 3 primary passbands. As in all of the above described embodiments, the filters (e.g., filters used in performing the steps of filtering) may themselves be embodied in an electronically switchable filter set, fixed filters in a two projector system, or a filter wheel wherein approximately ½ the wheel has filter characteristics of a left channel filter according to the present invention and approximately ½ the wheel has filter characteristics of a right channel filter according to the present invention.

Portions of the invention may be conveniently implemented in programming on a general purpose computer, or networked computers, and the results may be displayed on an output device connected to any of the general purpose, networked computers, or transmitted to a remote device for output or display. In particular, the invention includes the utilization of software that implements color processing separately on each ocular channel. Any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-axial cable(s), etc.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

BEST MODE FOR CARRYING OUT THE INVENTION

Figure 1A:
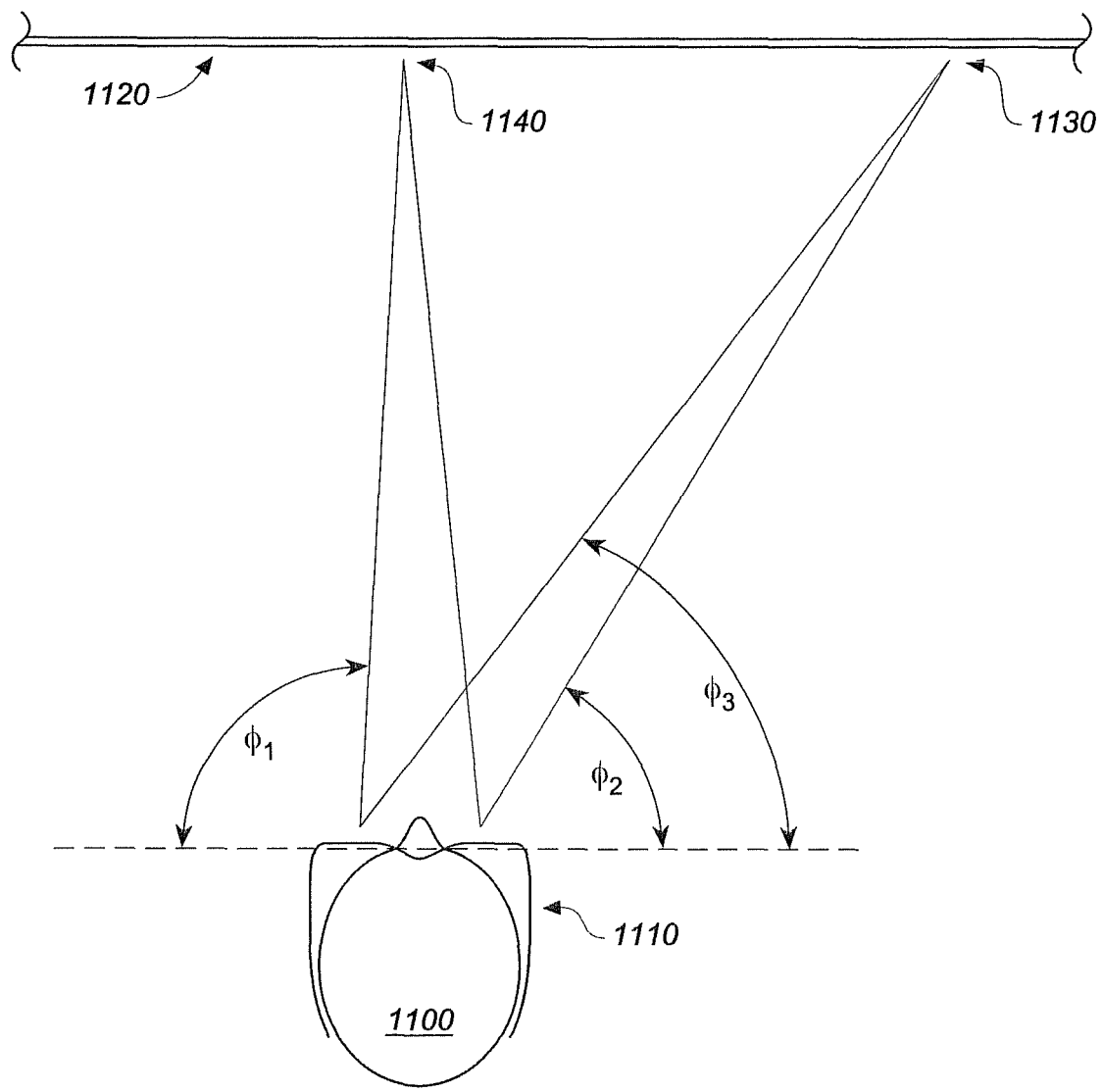
FIG. 1A is an illustration of viewing angles.

This invention addresses some of the problems with the Spectral Separation method for projecting 3D images, specifically this invention aims to improve the off-axis filter characteristics when thin film dielectric (interference) filters (e.g., right eye and left eye filters) are used to implement eyewear (e.g., glasses) for viewing spectrally separated images.

When light passes through an interference filter at a non-normal angle, the filter characteristics (response shapes, not to be confused with the physical shape of the filter) are changed, and the entire spectral filter response is shifted toward shorter wavelengths (toward the blue). The filter characteristic response shapes are also adversely affected at larger angles. This is a fundamental attribute of interference filters, and can be compensated for by designing the filter for a specific angle if all of the rays are parallel. In cases where the light bundle is not parallel, as in the case with the use of 3-D glasses, solutions involving only design of the filter characteristics are less practical.

Glasses currently used for spectral separation consist of flat interference filters located about 2 cm in front of the viewer's eyes. In a 3D Cinema theatre (e.g., 3D D-Cinema) the light from the screen does not pass through the interference filters at a single angle. For a viewer located center and one screen width back, when viewing the image at the center of the screen, the light from the center of the screen would pass through the interference filters of the glasses at a normal (perpendicular) angle (assuming the viewer's head is positioned such that the plane of the interference filters is parallel to the plane of the screen). Under similar conditions, light from the edge of the screen would pass through the interference filters at an angle of about 26 degrees.

This viewing position is reasonably close to the screen, but is not abnormal; many of the seats in a common auditorium are located closer, and angles of 40 degrees are possible. A 26 degree angle from the edge of the screen would have the effect of shifting the filter response toward the blue by about 14 nanometers (nm), and would somewhat distort the filter shape. The resulting 3D image appears to have noticeable color shift and increased left/right eye crosstalk towards the edges of the screen. The invention uses a combination of several techniques to reduce the effects of the blue shift, and to reduce the blue shift occurring from non-normal viewing angles. It should be remembered that the blue shift at the interference filters (e.g., lenses of the glasses having filters disposed thereon) is primarily important because it causes a mismatch between spectral characteristics of the projector filter (e.g., a filter wheel or electronically switched filter) and the glasses, or more precisely, a mismatch between the spectra of light forming the images (from whatever source) and the characteristics of the glasses at a given viewing angle.

Figure 1B:
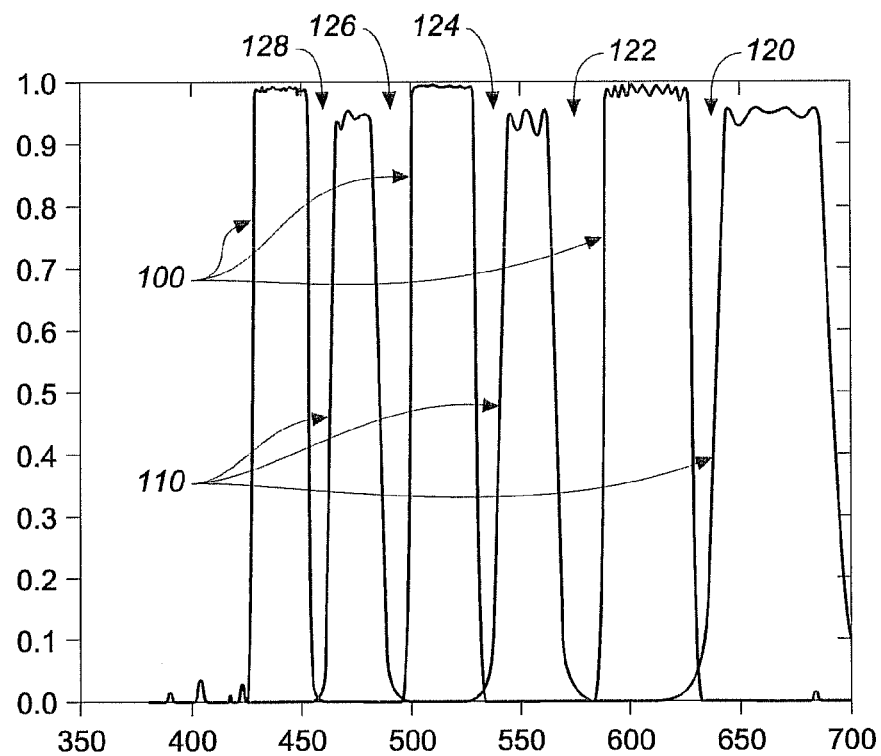
FIG. 1B is graph illustrating spectrum of left projector filter and right eye filter.

Referring now to the drawings, wherein like reference numerals designate identical or corresponding parts, and more particularly to FIG. 1A thereof, there are illustrated example viewing angles through glasses 1 110 for a viewer 1 100 of an image projected onto a movie screen 1120. The viewing angles range from normal to somewhat oblique (e.g., approximately $\theta i$ to $\theta_3$, respectively). The glasses 1110 include lenses with dielectric based interference filters. The non-normal viewing angles have an amount of blue-shift associated with the viewed image that increases with greater obliqueness of the viewing angle through the interference filters. For example, light entering the user's eyes from the more oblique angles $\theta_2$ and $\theta_3$ will be shifted toward blue wavelengths whereas the more normal angle $\theta i$ will have little, if any, blue shift. The blue shift, or wavelength shift, so described results from a shift in the interference filter properties such that the light bands passed by the filter are shifted toward shorter wavelengths. One effect of the blue shift of light viewed at the edge of the screen (e.g., light 1130) is to introduce crosstalk in the image. This can be reduced by increasing the guard bands between left eye and right eye filter characteristics. FIG. 1 B illustrates characteristics of exemplary filters used for 3D spectral separation. As shown in FIG. 1B, bandwidths for a left projection filter 100, and a right eye filter 110, includes guard bands 120, 122, 124, 126, and 128 which appear as notches between adjacent light bands (FIG. 1 B illustrates the right eye filter and the left projection filter; the right eye filter approximately represents bandwidths of the right projection filter and the left projection filter approximately represents bandwidths of the left eye filter). By increasing the width of the notch (or guard band) between left and right spectra in both the eye filters and the corresponding projector filters, crosstalk can be reduced. This also reduces the perceived color shift. This method also reduces the optical efficiency of the system, but this tradeoff may be made.

As can be seen in FIG. 1 B, as a pair, the left and right eye filters are complementary in that the filter properties of the left eye filter (approximately represented by the left projection filter 100) complement the filter properties of the right eye filter 110. It is not a full complement in that the guard bands. keep the combined filters from passing the entire portion of the spectrum between the longest and shortest wavelengths passed by the filters. Further, additional differences in bandwidth within the ranges of the various bands passed by the filters may be made so as to accommodate engineering decisions regarding color space issues that need to be addressed for a particular application.

Figure 2:
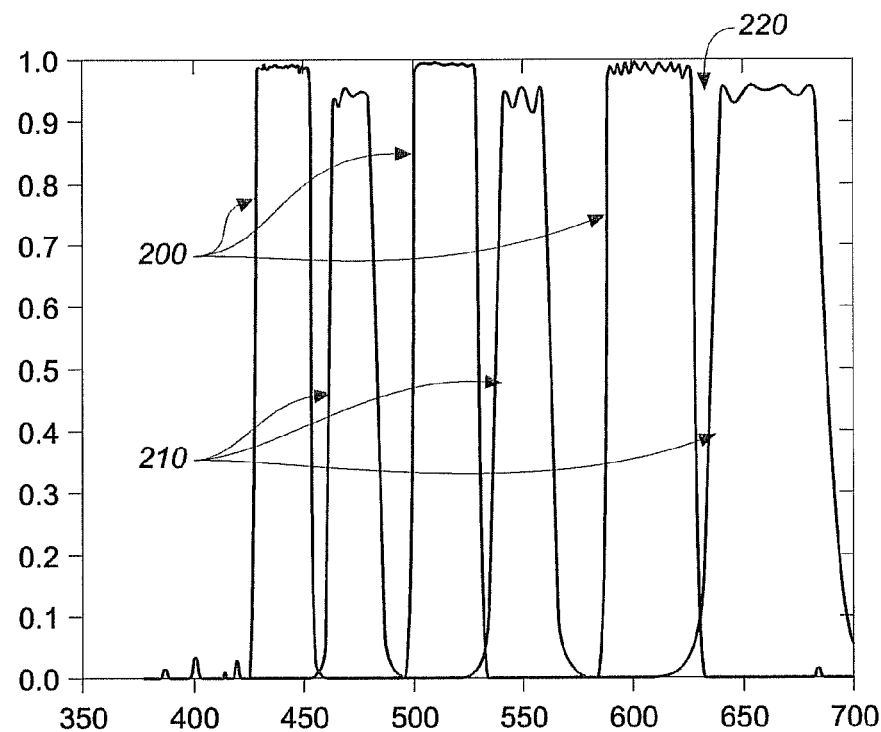
FIG. 2 is a graph illustrating spectrum of left projector filter vs. blue shifted right eye filter.
Figure 3:
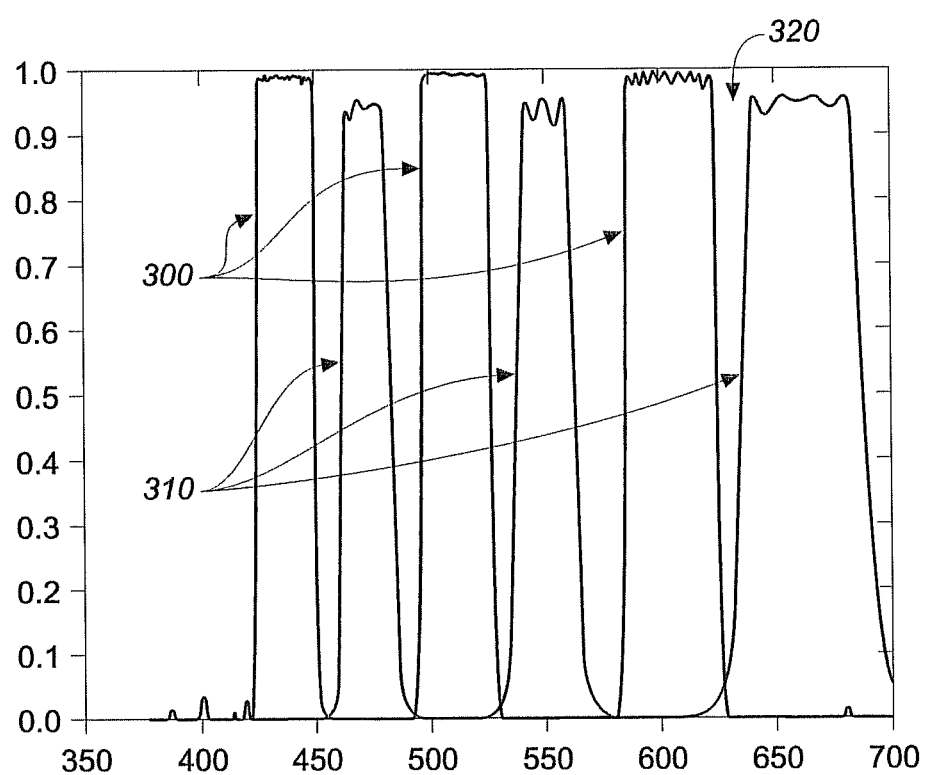
FIG. 3 is a graph illustrating spectrum of blue shifted left projector filter vs. blue shifted right eye filter.

Another approach is to pre-blue shift characteristics of the projector filter, or red shift the eye filters, such that for viewing at a normal angle of incidence through the eye filters, the filter characteristics are red shifted with respect to the projector filter. This increases the crosstalk and color shift for normal (on axis) viewing, but this can be tuned such that for on axis viewing the crosstalk and color shift is not objectionable. For the off axis case, the performance is improved since the difference between the projector filters and the blue shifted (off-axis) eye filters is lower. FIG. 2 and FIG. 3 describe this situation. As shown in FIG. 2, a left projector filter 200, and a blue shifted right eye filter 210 have guard bands including guard band 220 separating adjacent bands of light). As shown in FIG. 3, a blue shifted left projector filter 300 and a blue shifted right eye filter 310 have guard bands including guard band 320 separating adjacent bands of light. As seen by comparing FIG. 2 and FIG. 3, the notch (guard bands 210 and 310) separating the adjacent bands of light is larger in FIG. 3.

Applying this to the case described earlier, the shift of 14 nm at the edges of the screen could be reduced to an effective shift of 11 nm if the projector filter were shifted blue 3 nm. There would be a "red shift" of 3 nm at the center of the screen.

Another approach is to curve the filters, which can be implemented, for example, by disposing the eye filters on curved lenses of viewing glasses. This has the advantage that it has the potential of actually reducing the blue shift.

Figure 4A:
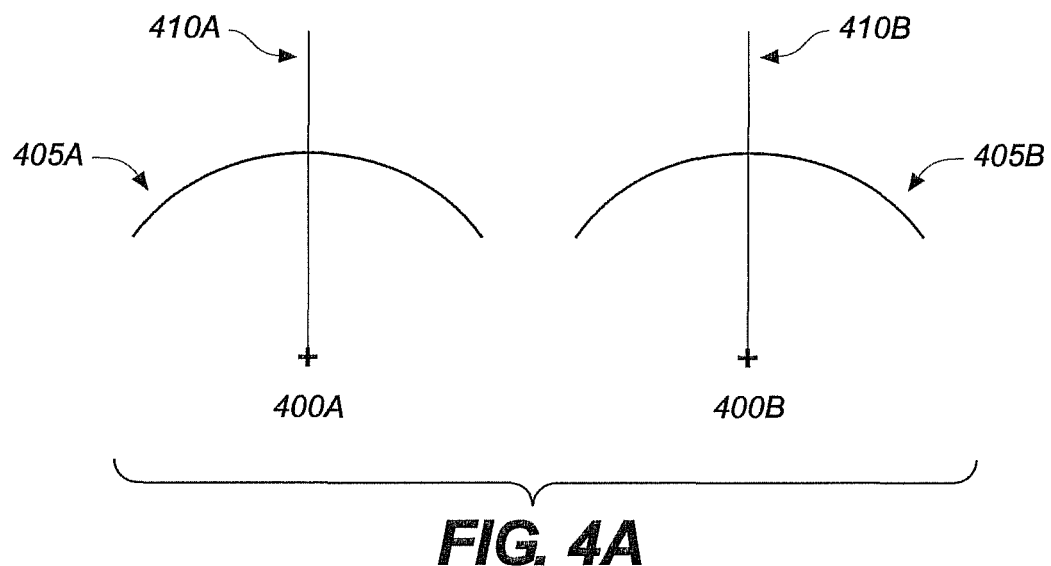
FIG. 4A is a diagram illustrating geometry of curved lenses centered at a viewer's pupil.
Figure 4B:
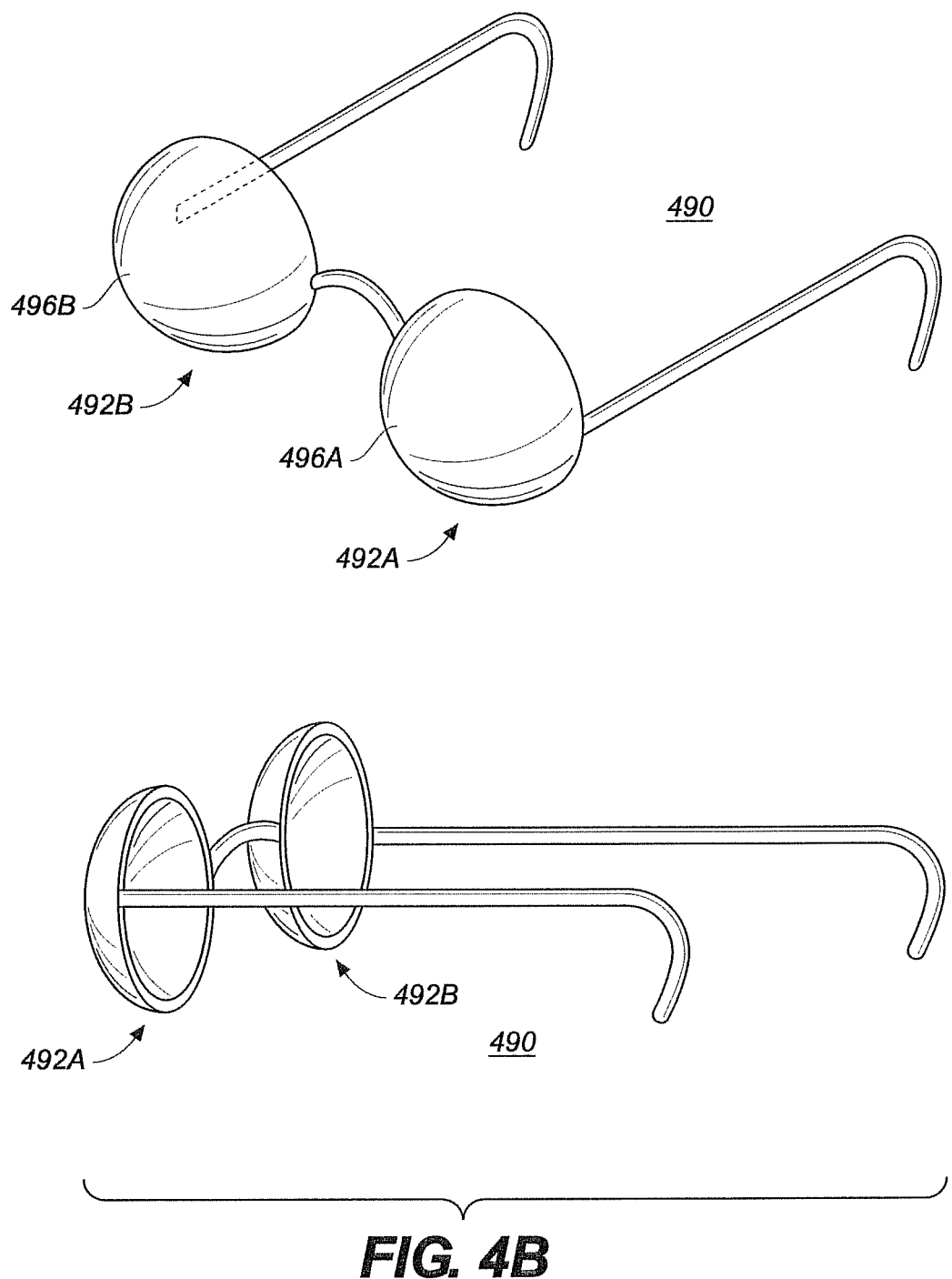
FIG. 4B is an illustration of glasses with spherical lenses.

FIG. 4A describes the geometry of curved lenses with a radius centered at the eye pupil. The lenses shown (lens 405A having optical axis 410A and lens 405B having optical axis 410B) have a width of 50 mm and the chord is located 20 mm from a respective pupil (and center of curvature) (e.g., 400A and 400B). The measurements were made for the inventor's eyes, but are representative of the general situation that could be implemented for anyone wearing 3D glasses. Using glasses with lenses having a spherical section with a radius centered on the entrance pupil of the eye virtually eliminates any blue shift in the filters because the light passes through the lenses (and hence, the filters) virtually normal to the lens/filter for viewing all parts of the screen. Some distortion occurs when the viewer turns his eyes to look at different parts of the screen, but for the geometry shown, this is not significant. FIG. 4B illustrates two views of a pair of glasses 490 having curved lenses 492A and 492B which are both spherically shaped and having spectrally complementary dielectric filters disposed thereon (left eye filter 496A and right eye filter 496B).

The curvatures of the lenses so implemented are distinguished from prescription glasses in that the implemented curvatures are not to correct vision. Nevertheless, in one embodiment, the curvature of the invention may be implemented over or in addition to other lens characteristics intended to fulfill a viewer's prescription needs.

The curved lens solution still has some limitations. First, the radius of curvature of 30 mm resulting from the geometry described above appears very "bug-eyed," and would be esthetically unpleasing. Second, this curvature would produce glasses whose weight would be centered well in front of the nosepiece, and they would be poorly balanced. Third, this radius may be too short to allow uniform coating of an interference filter.

Figure 5:
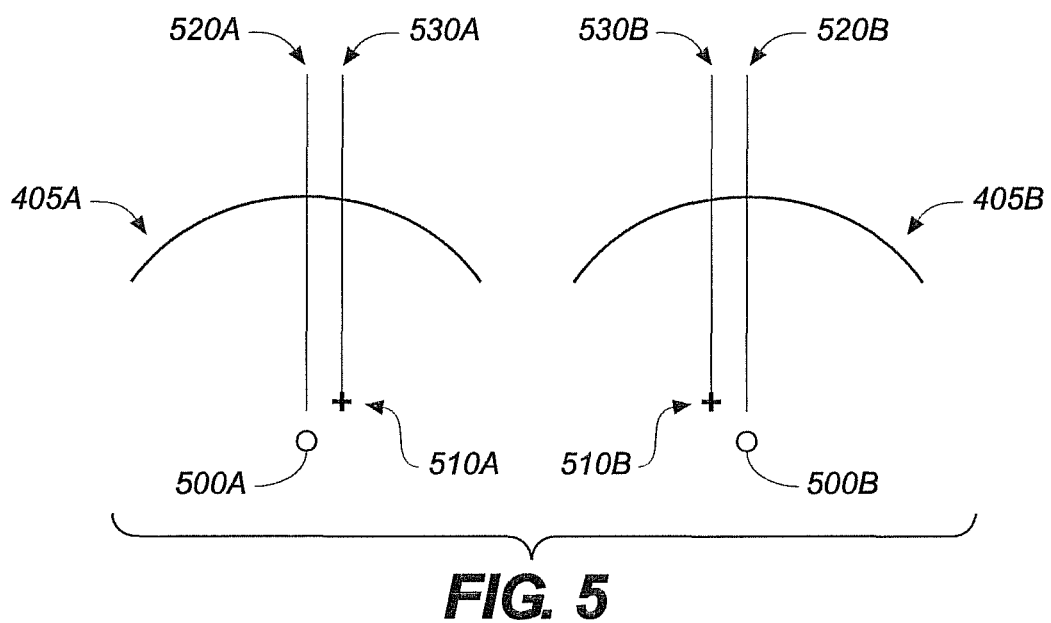
FIG. 5 is a diagram illustrating geometry of curved lenses and showing child interpupillary distances.

Fourth, the interpupillary distance of eyes varies significantly, and this would mean that glasses designed for the mean would be improperly curved for someone with other than the mean distance. For example, with a child the situation may result in an angle of about 10 degrees for viewing of the center of the screen. As shown in FIG. 5, the location of a child's pupils (510A and 510B) and the resulting optical axis of the child's eye (530A and 530B) is displaced off the corresponding optical axis of the glasses (520A and 520B respectively centered at center of curvatures 500A and 500B).

Even considering the limitations associated with curving the lenses and/or filters, this technique is valuable. Although in general cases or productions for mass audiences, it may not make sense to attempt to have the radius of curvature centered directly at the entrance pupil of the eye. By making the lenses spherical but with a radius of curvature centered behind the entrance of the pupil of the eye, much of the problems are removed (e.g., bringing the center of gravity back toward the viewer, and a less "bug-eyed" appearance) and the advantages are significantly retained.

In one alternative, the lenses may use a non-spherical curvature, such as a cylindrical curvature where the lenses are only curved from left to right, and there is no curvature in the vertical direction. This is possible because the screens always have an aspect ratio such that the horizontal extent (e.g., width) is about twice the vertical extent (e.g., height). Another alternative is to use a curvature that is non spherical in either direction, such as a multiple radius surface, or one that follows a specific mathematical function. These have advantages for allowing a greater interpupillary variation. An additional advantage of curved lenses includes the reduction of reflections from bright surfaces behind the viewer, since these reflections are not directed toward the eye.

A final approach involves the design of the interference filters. This approach requires changing the thickness of the dielectric layers as a function of the distance from the center of each eye filter. If the thicknesses of the dielectric layers are increased at the edges of the filters such that they cause a red shift in the filter characteristics, this can be used to compensate for the blue shift caused by the angle change at the edges of the field of view through the filters.

If the filters are implemented on flat glass, the thickening of the dielectric layers may increase manufacturing costs due to difficulty in implementing the increased thicknesses at different points on the flat glass. However, when coating on a curved surface, some thickening occurs during the coating process. This approach therefore becomes a practical adjunct to the curved lens solution.

The best method for achieving high performance with interference filters incorporates the four techniques described above in the following manner. First, the guard bands between left and right eye filters should be greater than approximately 2% (e.g., 2.2%) of the wavelength of that filter band. For example, for a filter with a left/right crossover at 640 nm, the guard band should be approximately 14 nm. Second, the projector filter should be designed to be blue shifted (with respect to the eye glass filters) greater than 0.6% of the wavelength of the filter band. In the same example, the center of the guard band for the projector filter would be 640−3.8=636.2 nm. The combination of these allow nominally manufactured lenses and eye filters (when used with a nominally manufactured projector lens and projector filters) to be tilted such that a blue shift of 18 nm occurs before serious degradation of the image occurs.

Figure 6:
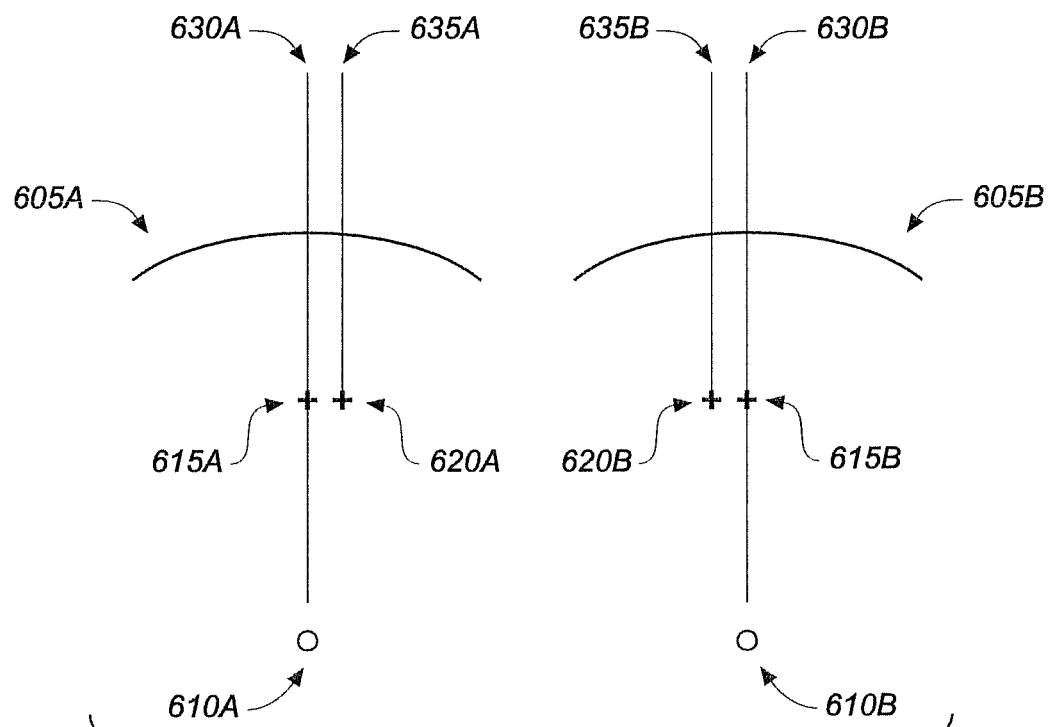
FIG. 6 is a diagram illustrating geometry of curved lenses for 20 degree angle at an edge of the lenses.

However, the combined manufacturing tolerance from the projector filters and the eye filters reduces this to about 9 nm. The 9 nm guard band that remains can be used for accommodating the blue shift caused by the light going through the left and right eye filters at an angle. The angle through the left and right eye filters that causes a 9 nm shift is about 20 degrees. If the curvature of the eye filters (e.g., curvature of lenses upon which the eye filters are disposed or incorporated) is adjusted to allow the light from the edge of the eye filters to pass through to the eye at a maximum of 20 degrees relative to the normal of the eye filters at the edge, then serious degradation of the image at the edge of the eye filters will not occur. For a simple sphere, and with the eye looking straight at the center of the screen (e.g., a primary gaze normal to a tangent of the lens), the radius of curvature needed to achieve this is approximately 50 mm. As shown in FIG. 6 (lenses 605A and 605B have respective centers of curvature 610A and 610B; adult pupil locations at 615A, 615B and corresponding optical axis of the lenses and adult eye 630A and 630B; child pupil locations at 620A, 620B and corresponding optical axis of child's eye 635A and 635B). In practice the radius of curvature may be somewhat greater than 50 mm to accommodate the pupil shift when the eye is turned to observe the side of the picture screen.

Figure 7:
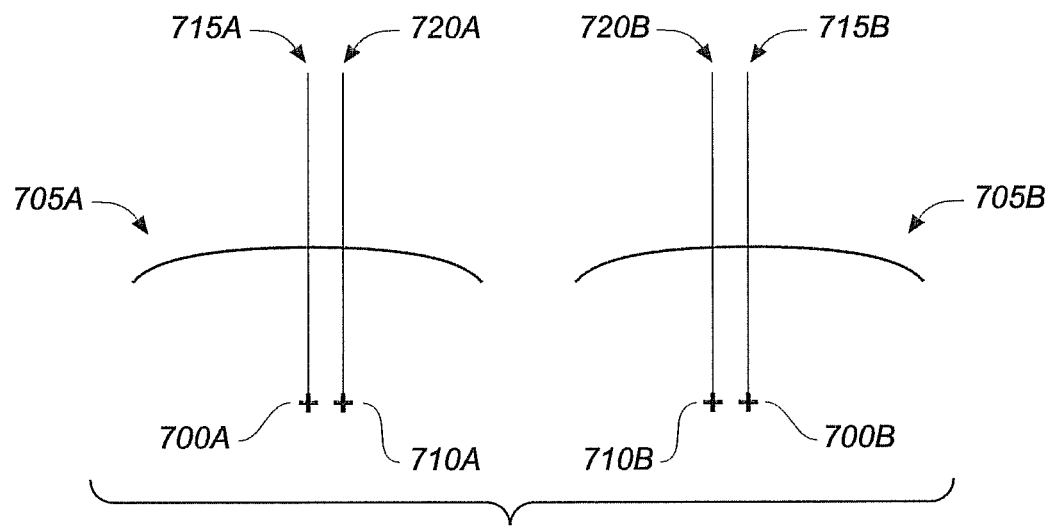
FIG. 7 is a diagram illustrating geometry of curved lenses with non-spherical curve.

Although spherically shaped lenses are preferred, non-spherical lenses do have some advantages. FIG. 7 shows left and right lenses 705A and 705B with a non-spherical curve (adult pupils 700A, 700B; optical axis of the lenses 715A, 715B; child pupils 710A, 710B, and corresponding optical axis of child's eye 720A, 720B). The left and right lenses incorporate corresponding left and right eye filters. The filters are, for example, disposed on one or more surfaces of the lenses. The advantages of a non-spherical curve are found in accommodating variations of interpupillary distances between different viewers. Finally, a non-uniform dielectric coating can be used to red shift the filter characteristics at the edges of the filters, further improving the performance.

Figure 8A:
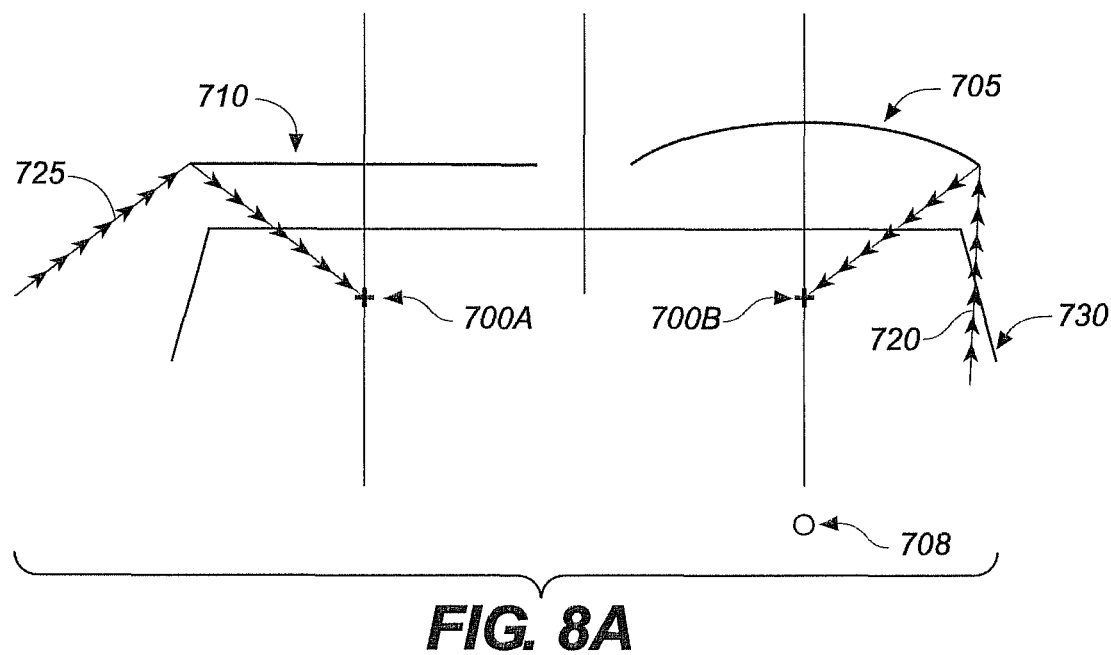
FIG. 8A is a diagram illustrating effect of lens curvature on light coming from behind a viewer.
Figure 8B:
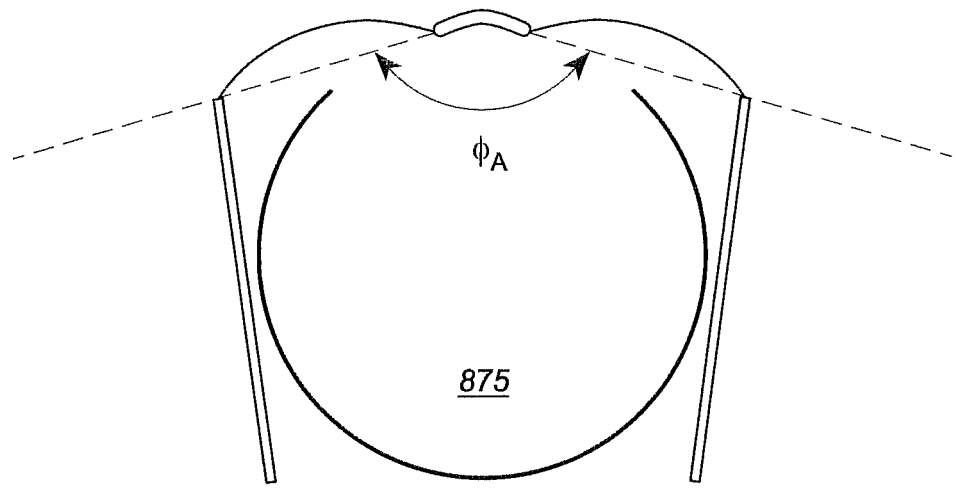
FIG. 8B is a drawing of dihedral angles for a pair of viewing glasses.
Figure 8B:
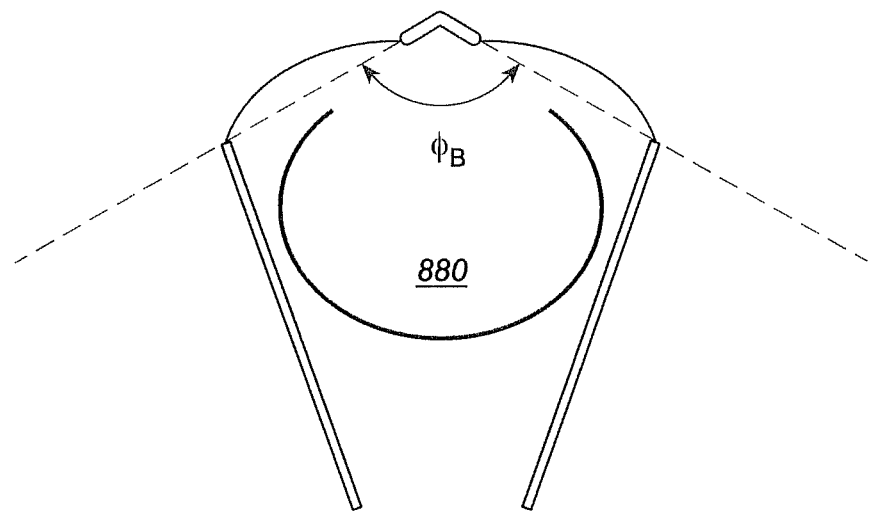

A more important advantage is that reflections from behind the viewer are reduced by the curvature. This is important because the interference filters disposed on the eyeglass lenses reflect light that is not transmitted, and are therefore quite reflective. Without the curve, the audience behind the viewer is visible across much of the back side of the lens. With the curve, only a portion (or none) of the lens has a reflection from behind the viewer. FIG. 8 illustrates this advantage by comparison of a curved lens 705 having a center of curvature at 708 and a flat lens 710. With respect to the flat lens 710, a relatively wide angled light ray 725 from behind the viewer is reflected off the flat lens into the viewer's pupil 700A. With respect to the curved lens 705, it is shown that only a relatively narrow angle (light ray 720) can reach the viewer's pupil 700B via reflection from the curved lens. In addition, the viewer's temple 730 blocks most light rays sufficiently narrow to enter the viewer's temple. Further optimization of the techniques discussed can be achieved by accommodating interpupillary distance variation among the population. In general, interpupillary spacing is directly related to head width and girth. Adults have larger width and girth, and wider interpupillary spacing, while children are smaller in these dimensions. Ideally, a viewer would wear glasses with the left and right eye filters disposed on corresponding left and right lenses of the glasses where the interocular spacing of the lenses is optimized for the viewer's particular interpupillary distances.

In a theatre or other large volume application, it is cumbersome to stock different sized glasses. As an optimization to the curved glasses it is possible to incorporate a feature into the design of the frame of the glasses that automatically adjusts a dihedral angle between the curved lenses to accommodate wider and narrower interpupillary spacing. Adjusting the dihedral angle insures a close to normal light incidence when viewing the screen with a primary gaze. This adjustment is done by exploiting the flexibility and bending strength properties of molded thermoplastic frames, or other frames having similar properties of strength and flexibility (e.g., metals, fiberglass, composites, etc).

In this design there is an outward convexity to the shape of the frames, which creates a dihedral angle between the lenses. In one embodiment, the bridge of the glasses is designed to flex slightly with head size variation due to pressure on the frame (e.g., pressure exerted on the temple portion of the frames). This flexing results in dihedral angle changes. As shown in FIG. 8B, wider heads 875 with (statistically) larger interpupillary spacing have a larger dihedral angle $\theta_A$ In this context, the dihedral angle is defined as the angle between a planes extending through endpoints on opposite ends of the lenses (see dashed line in FIG. 8B). Smaller heads 880 would have a smaller dihedral angle $\theta\beta$. With a smaller head and corresponding smaller dihedral angle between the lenses, the distance between the forward directed radii of the curved lenses is reduced to more closely match the smaller interpupillary spacing.

Figure 9:
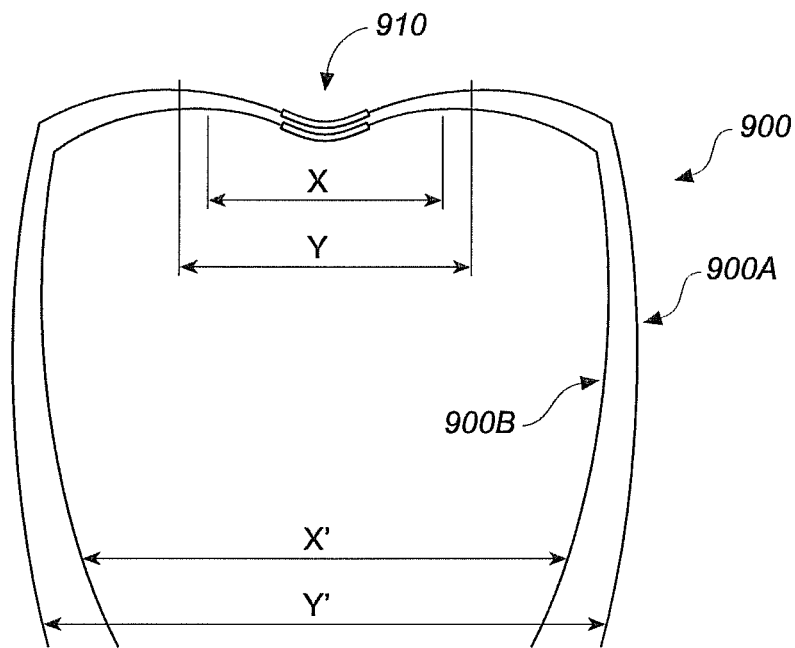
FIG. 9 is a drawing illustrating glass frames configured for use on different sized heads.

FIG. 9 illustrates both cases. Glasses 900 are illustrated in a first position 900A as when worn by an adult with a relatively larger sized head. Interpupillary spacing of the adult is represented by Y. A temple or "around the ear" portion of the frame of the-glasses have a spacing represented by Y' to accommodate the adult's head size, causing a flex of the bridge 910 of the glasses and resulting in a larger dihedral angle between the lenses.

Position 900B, is similar to that when worn by a child with a relatively smaller sized head, and the interpupillary distance of the child is represented by X. The bridge 910 is less flexed because the temple or "around the ear" spacing is reduced to X' which results in a smaller dihedral angle between the lenses. The smaller dihedral angle accommodates the child's smaller interpupillary spacing as described above.

Figure 10:
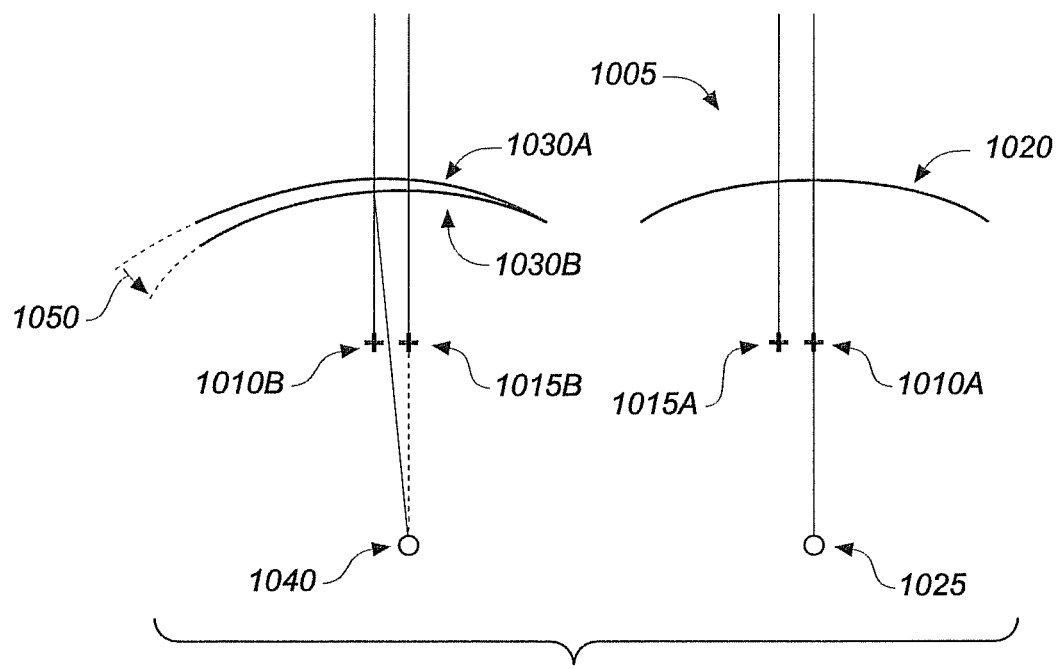
FIG. 10 is a diagram illustrating geometry of optimized dihedral glasses.

FIG. 10 illustrates details for the lenses. At 1005, an adult right eye pupil 101 OA is shown relative to a child's eye pupil 1015A), with the lens 1020 having a center of curvature at 1025A. As seen in FIG. 10, comparing the position of lens 1020 to lens 1030 in position 1030A, a larger dihedral exists between the lenses. This is the appropriate lens configuration for an adult.

When worn by a child (or person with a relatively smaller sized head), an amount of flex of the bridge of the glasses cause lenses 1030 and 1020 to decrease in dihedral as illustrated by 1050 for the left eye (consistent with FIG. 9, a similar dihedral decrease (not shown) occurs for the right eye in lens 1020). The center of the radius of curvature (1040 for lens 1030 in position 1030B) has shifted from an alignment corresponding to the adult pupil IOIOB to an alignment corresponding to the child's pupil 1015B. FIGS. 8B, 9, and 10 are illustrative of an accommodation for both "adult sized" and "child sized" heads and interpupillary distances. However, it should be understood that interpupillary distances and head sizes vary amongst the entire population. While near perfect alignment may occur for some viewers, it is not required and the embodiments illustrated function to accommodate the varying head sizes and interpupillary distances by improving the viewing angle alignments in most cases.

The lenses shown in FIG. 10 have a 50 mm radius of curvature and the dihedral angle is 2 degrees. With conventional sized frames the dihedral angle change for the average adult verses child is about 5 degrees (approximately 2.5 degrees accounted for on each side of the frames for a total of about 5 degrees). This technique works best with lenses with a radius of curvature that is about half the length of the temple portion of the glasses.

As noted above, the present invention addresses some of the problems with the Spectral Separation method for projecting 3D images, specifically an improvement in the efficiency, increase in the color gamut, and a reduction in the amount of color compensation required. In some cases, the color compensation may not be required.

Figure 11:
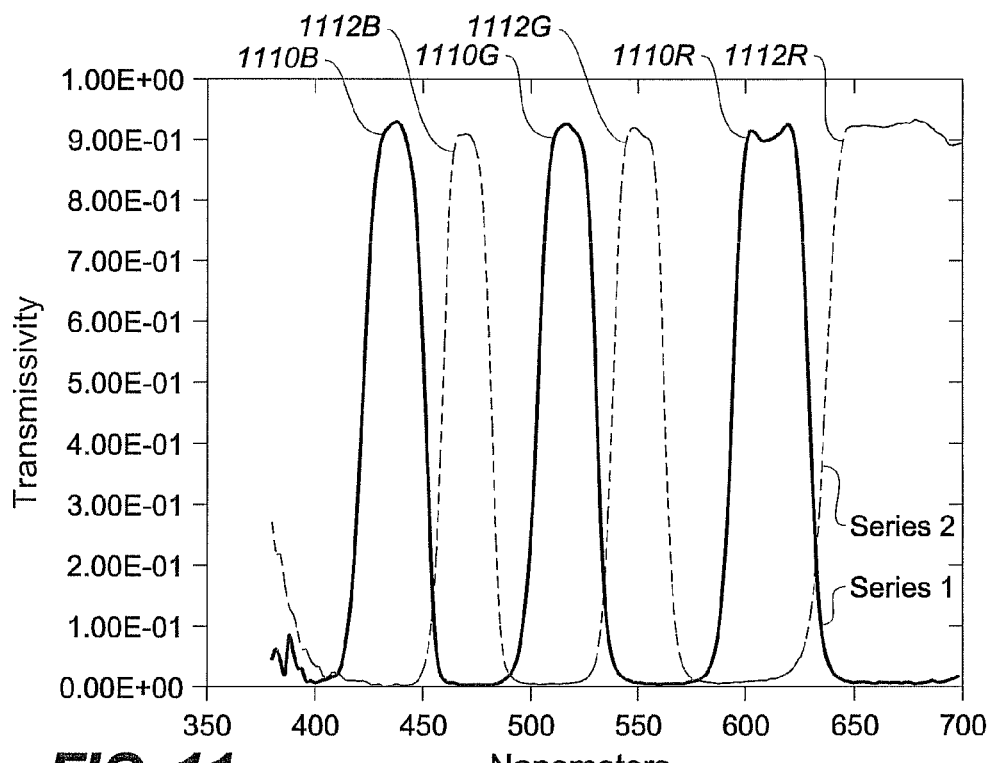
FIG. 11 is a graph of conventional left and right spectral separation filters.

Referring again to the drawings, and more particularly to FIG. 11 thereof, there is illustrated a set of left and right spectral separation filters representative of those currently used in D-Cinema 3-Dimensional (3D) presentations. As shown in FIG. 11, the conventional spectral separation filters provide three primaries for each eye by dividing the red, green, and blue color channels of a projector into two sets of primaries, one set for the left eye (primaries 111OR, HOG, and 11 OB) and one set for the right eye (primaries 1 1 12R, 1 112G, and 11 12B). For example, the left eye is illustrated as having shorter wavelength blue, green, and red bands than the right eye. Following a conventional design, the left eye may have, for example, passband wavelengths of approximately 400 to 445 (blue), 505 to 525 (green), and 595 to 635 (red). The right eye may have, for example, passband wavelengths of approximately 455 to 495 (blue), 535 to 585

(green), and 645 to 700 (red). While a filter configuration like that illustrated in FIG. 11 provides all three colors to each eye, the resulting image has a somewhat different hue in each eye. In order to make the images more closely match the colors for each eye, and match the colors in the original image, color correction is applied. The color correction reduces the overall efficiency of the system (since it boosts some primaries preferentially over others). In addition, even with color correction, the new left and right primaries do not have as large of a color space as the projector, and thus can only produce a portion, but not every color that would be present if projected without the filters in a 2D system.

Figure 12:
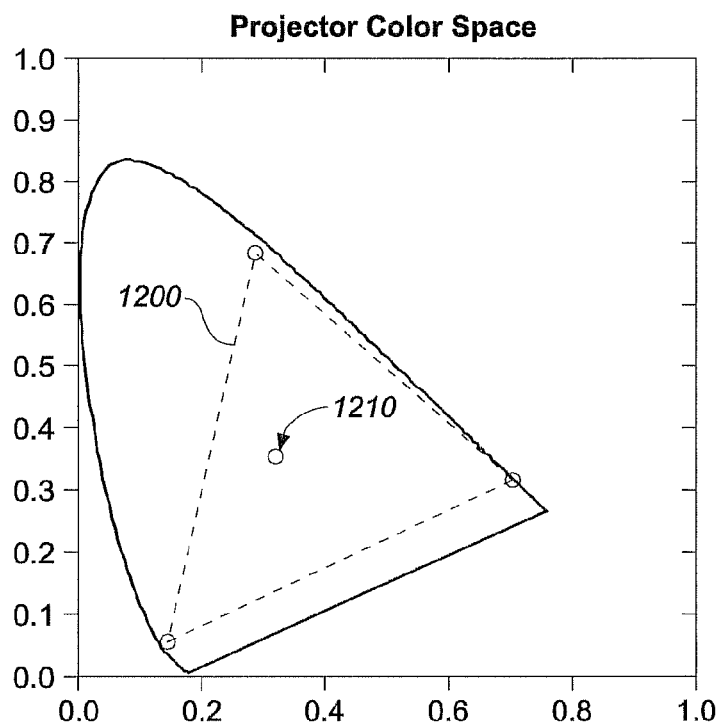
FIG. 12 is a 1931 CIE chromaticity diagram illustrating the color space of a typical Digital Cinema (D-Cinema) projector.

FIG. 12 is a 1931 CIE chromaticity diagram illustrating the unfiltered color space 1200 and P3 white point 1210 of a typical Digital Cinema (D-Cinema) projector. The unfiltered color space of the projector represents the color space available for projecting images.

Figure 13:
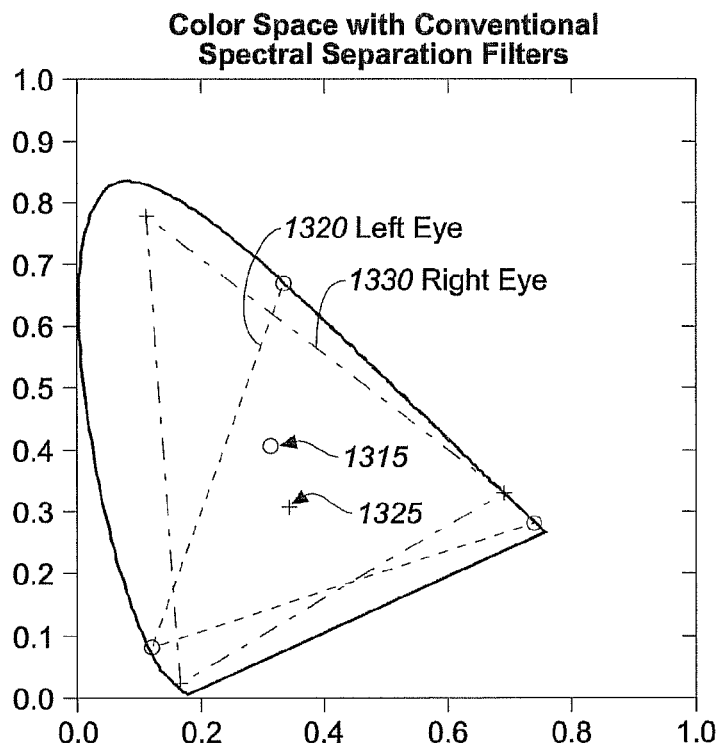
FIG. 13 is a 1931 CIE chromaticity diagram illustrating the color space of conventional spectral separation filters.

FIG. 13 is a 1931 CIE chromaticity diagram illustrating the color space of conventional spectral separation filters used to separate the left eye channel 1320 and right eye channel 1330 in a D-Cinema projector. The intersection of the left and right eye channel color spaces represents the potential color space of images projected through the filters. As can be seen in FIG. 13, the potential color space using the conventional filters is restricted compared with the projector color space (1200, FIG. 2). In addition, the P3 white point 1310 is an important factor in the overall result of the projected image, and is significantly shifted compared to that of the projector alone—see P3 white point 1315 for the left eye and P3 white point 1325 for the right eye and compare to projector P3 white point 1210, shown for reference in FIG. 13.

The present invention pertains to the filter installed in the projector, which is the main controlling factor in the color space of the system. The invention addresses both the efficiency and the color space issues by splitting at least one of the projector primaries into subparts. In one embodiment, the blue and green projector primaries are split into three sub-parts each. The exact wavelengths of where the primary is split may be chosen in any manner that takes into account the particular color space to be reproduced.

Figure 14:
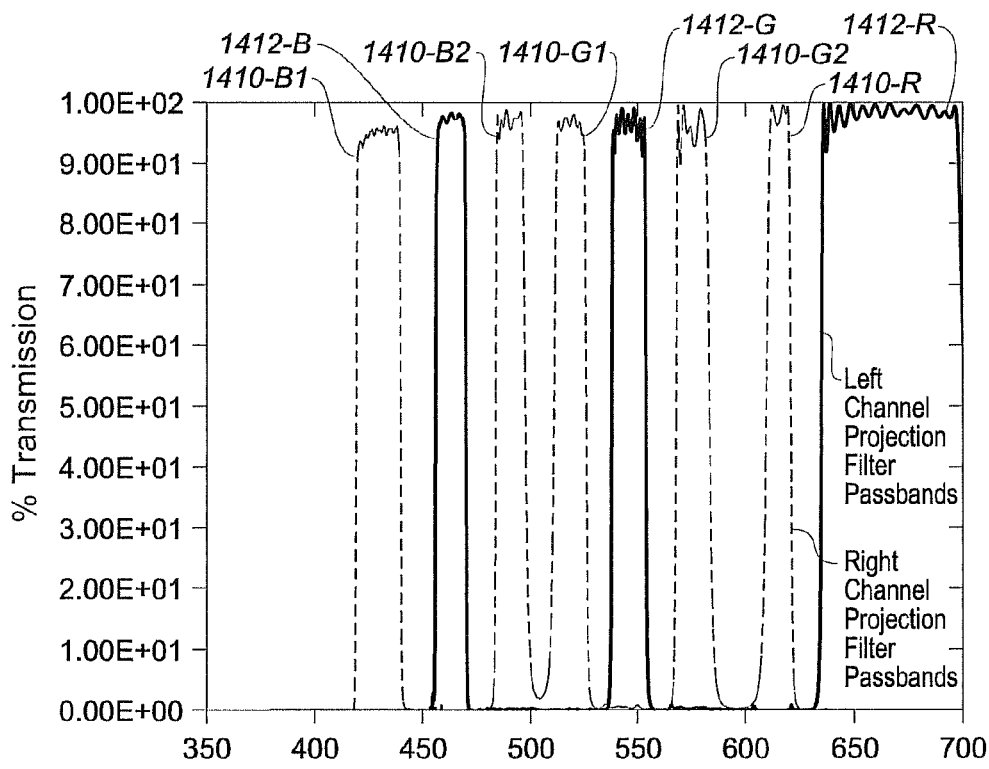
FIG. 14 is a graph of left and right projector filters.

For example, as shown in FIG. 14, in one potential configuration, a right channel projection filter has passband wavelengths of blue at 400 to 440 (410-B1) and 484 to 498 nm (410-B2), green at 514 to 528 (1410-G1) and 567 to 581 nm (1410-G2), and red at 610 to 623 nm (1410-R). A left channel projection filter has passbands wavelengths of blue at 455 to 471 nm (1412-B), green at 539 to 556 nm (1412-G), and red at 634 to 700 nm (1412-R). Of course other permutations exist, such as, for example, switching the left and right channel wavelengths, or switching the green and blue wavelengths etc. In addition, the passband wavelengths are approximate and each band may vary by, for example +/−5 nm or more. Such variations may occur by shifting the entire passband and/or by selecting one or more different endpoints for the passbands. An important consideration is that such variances should not reduce the guard band between passbands to a level where a system using the filters incurs unacceptable levels of crosstalk between the channels.

The selection of passband wavelengths is made such that when an image is projected with a D-Cinema projector with a P3 white point 1210 and color space 1200 as, for example, shown in FIG. 12, the resultant color space in the channels, and more particularly the combined color spaces of the projected images, have a color space and white point that more closely match the color space 1200 and P3 white point 1210 compared to the color space and white point that occurs when using conventional spectral separation, such as shown in FIG. 13. The passbands are also chosen to maximize efficiency by selecting passbands that will result in having approximately the same, or balanced, luminance levels in each channel. So long as sufficient bandwidth is available in each passband to achieve the stated improvements (as, for example, proven by experimental results), there are no theoretical limits on the variances that may occur over the example passband wavelengths described herein.

Note that there are gaps in the spectrum of colors that did not exist in the previous design (for example between 498 nm and 514 nm for blue to green transition in the right channel, and between 581 nm and 610 nm for the green to red transition in the right channel). These notches are designed to increase the color space so that it matches the P3 color space in D-Cinema projectors. The filter response needed to get the correct P3 result was derived using the real (measured) spectral response from the D-Cinema projectors, which is reflected in the chosen wavelengths for the passbands described above.

Figure 15:
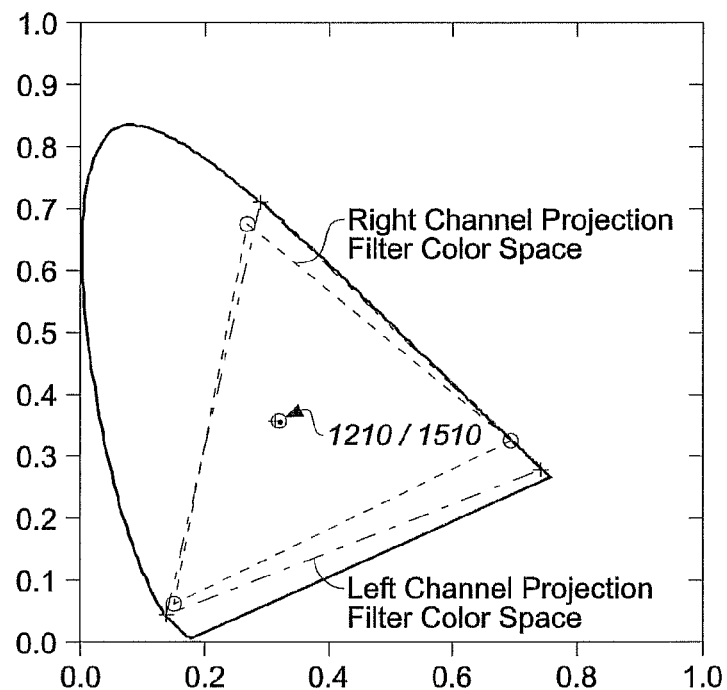
FIG. 15 is a 1931 CIE chromaticity diagram illustrating the color space of color filters.

Also note that in the illustrated example, the three sub-parts are structured such that they are interleaved between the right and left channels. From a practical standpoint, this means that the three sub-parts are arranged such that one filter has at least one sub-part lower and one sub-part higher than the sub-part of the other filter. For example, in FIG. 14, the blue passbands of the right channel projection filter straddle the blue passband of the left channel projection filter. Such interleaving is preferably maintained in the various embodiments, including those embodiments that divide passbands into more than 3 sub-parts. Although theoretically there is no limit on the number of sub-parts in which any passband may be divided, due to cost and other factors, a point of diminishing returns is quickly reached and 3 sub-parts each of blue and green and 2 sub-parts of red appears to have the greatest return with reasonable cost. With improved components and/or reduced costs of components, a different economic analysis may result and 4, 5, or more sub-parts, including additional sub-parts in the red, may be justified for additional incremental increases in the color space. Such incremental improvements might also be justified under current economic and cost models for upper end equipment markets. FIG. 15 shows the color space diagrams for the filters of this invention described above. As can be seen in FIG. 15, the intersection, or product, of the left channel projection filter color space and right channel projection filter color space results in a color space more closely matching the color space 1200 (FIG. 12) than which occurs with conventional spectral separation. Some portions of the color space are reduced and other portions of the color space are increased. Although some areas of the color space are reduced, the reduced areas are less important to viewers. Areas of the color space to which viewers are more sensitive have made significant gains with the invention versus conventional spectral separation.

Figure 16:
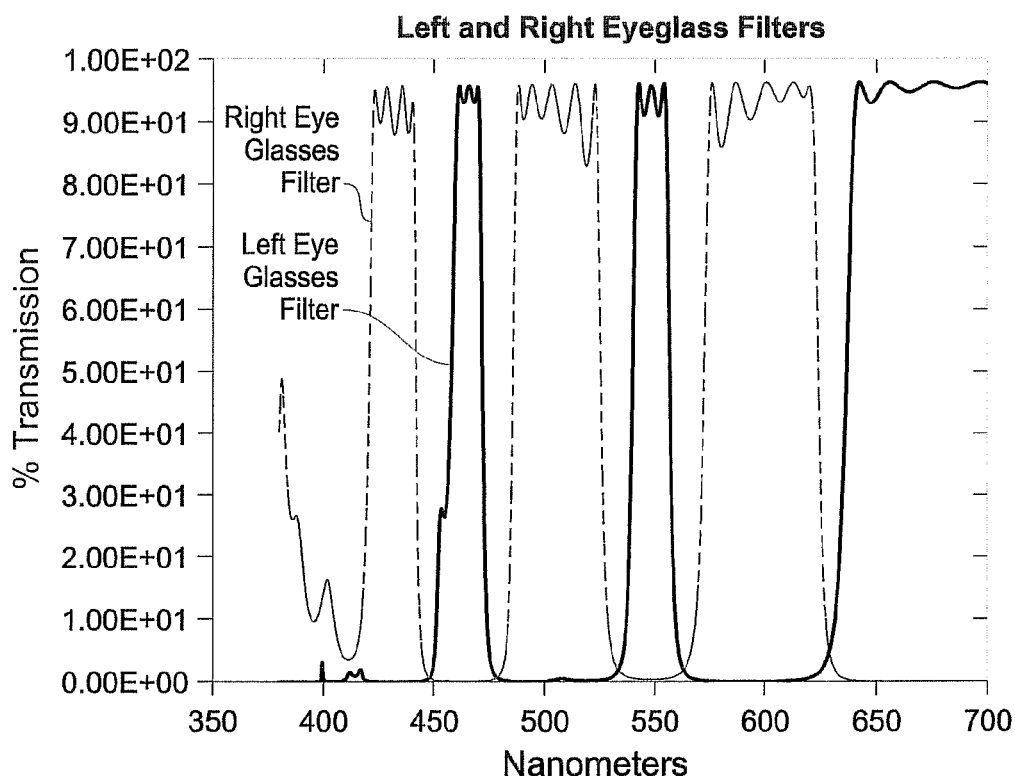
FIG. 16 is a graph of left and right eyeglass filters that may be applied in conjunction with the projector filters described in FIG. 4.

Glasses used to view the projected images need not be as complex as the projector filter since the notches that provide the improved color space have no impact on the left/right eye (or left/right channel) separation, and therefore the notches do not need to be reproduced in the viewing filters of the glasses (the projector filter has more bands, and therefore more complexity than the viewing filters). As shown in FIG. 16, in one configuration the right eye lens of the glasses would have a filter with passband wavelengths of approximately 430 to 440 nm (part of the blue band), 484 to 528 nm (part of the blue, and part of the green band), 568 to 623 (part of the green band and the red band), which encompass the passbands of the right channel projector filter. The left eye lens of the glasses would have a filter with passband wavelengths of 455 to 471 (blue), 539 to 555 nm (green), and 634 to 700 nm (red) which encompass the passbands of the left channel projector filter. Wavelengths below the beginning wavelengths in the blue (approximately 430 nm) and wavelengths above ending wavelengths in red (approximately 700 nm) are beyond the visible spectrum and may either be included or excluded from the passbands. Other permutations exist as described before (including left/right channel exchange), but the left and right eye lenses of the glasses include corresponding permutations that encompass or match the left and right channel projector filter permutations.

Along with other factors such as projector color space and white point, the final images viewed through the glasses are a product of the projecting filters and viewing filters (e.g., filters in the glasses used to view the images). In the described embodiments, the receiving filters are less demanding as far as passband design because they have fewer notches and they generally encompass more wavelengths in at least some of the passbands. The important role played by the glasses is separation of the entire images as whole and as projected, not specific bands within each image as described for the projection filters.

The overall response (color space and white point) to the eye is the product of the spectral response of the projector filter(s), the lenses/filters of the eyeglasses, and the base D-Cinema projector response (color space and white point of the D-Cinema projector without the left and right channel projector filters). Nevertheless, the color space is mostly defined by the position of the passbands and the notches in the yellow and blue-green bands, and therefore the overall response is mostly a function of the projector filter (because the glasses do not need and preferably do not have the notches).

In part, because of the lower complexity of the eyeglass (or viewing) filters, the eyeglass filters are also comparatively less expensive to produce compared to the projection filters. This is a benefit because the eyeglass filters are generally embodied as a pair of glasses worn by viewers (including the general public), and are therefore likely to be subjected to less than perfect care, whereas the projector equipment including the projector filters are generally kept in more secure and stable environments. In addition, the glasses are generally purchased in larger numbers than the projector filter(s).

Another aspect of the differing complexities of the eyeglass (or viewing) filters compared to the projector filters is that they create an asymmetric filtering system. That is, each viewing filter and its corresponding projection filter of the same channel are not symmetric in bandwidth and/or the number of passbands. The passbands of the viewing filters may also entirely encompass the passbands of the projection filters (and, in some embodiments, the passbands of the projector filter may be blue-shifted relative to the passbands of the viewing filters to account for viewing angle related blue shifts in the viewing filters). Regardless of whether the projection filters are entirely encompassed by the passbands of the viewing filters, the passbands of the viewing and projection filters preferably are different. Therefore, a preferred result is an asymmetric filtering system.

The particular projector filter response used in describing the invention uses 3 divisions of the blue and green projector color bands. The red band is divided into two parts (one part for the right channel and one part for the left channel). Additional divisions may be utilized for increased color space, but additional cost of the filters may be incurred. Careful selection of the optical passbands provides a close match to the color space and white point of the original unfiltered projector. The design of the glasses is such they have the same complexity of the conventional spectral separation design, but provide adequate selectivity to minimize crosstalk between the images projected in the left and right channels.

Figure 17A:
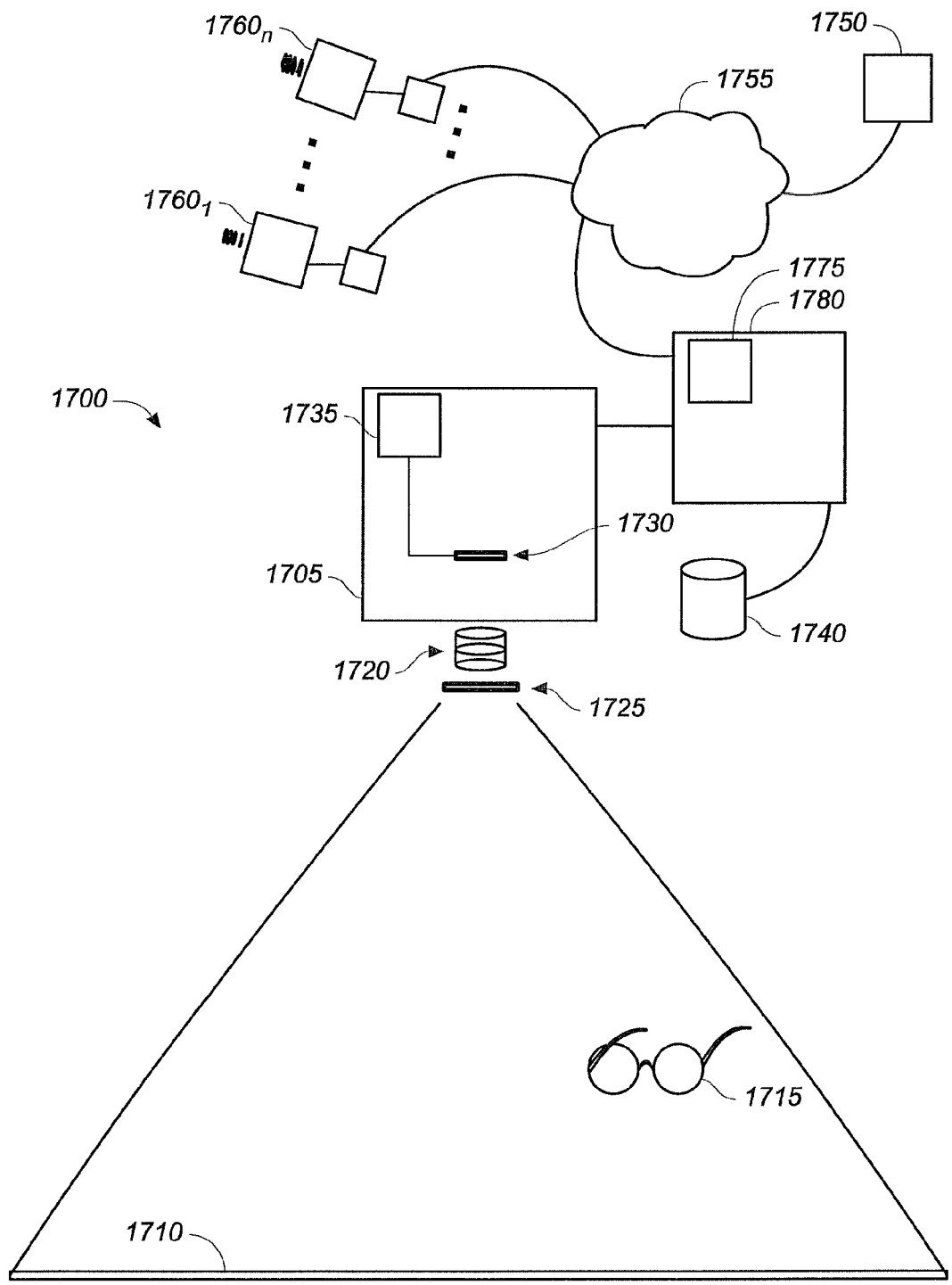
FIG. 17A is a block diagram of a projection.

FIG. 17A is a block diagram of a projection system 1700 according to an embodiment of the present invention. The projection system 1700 includes a digital cinema projector 1705 that projects spectrally separated 3D images (a left channel image and a right channel image) through projection filter 1730 and projection lens 1720 onto a screen 1710 for viewing with glasses 1715. Glasses 1715 include, for example spectrally separated filters disposed as coatings on each lens of the glasses such that the right lens comprises a filter that matches or encompasses the passbands of the right channel filter and the left lens comprises a filter that matches or encompasses passbands of the left-channel filter (each of the left and right channel images are intended to be viewed by a viewer's corresponding left or right eye through the corresponding left or right eye lens/filter of the glasses). The glasses 1715, and system 1700, may, for example, include any of the features, systems, or devices described in Richards et al, a U.S. Patent Application entitled METHOD AND SYSTEM FOR SHAPED GLASSES AND VIEWING 3D IMAGES, Ser. No. 11/801,574, filed May 9, 2007, the contents of which are incorporated herein by reference as if specifically set forth.

The projector 1705 receives image data for projection from a server 1780. 3D content is provided to the server 1780 from, for example, a disk drive 1740. Alternatively, 3D content may be transmitted to projector 1705 over a secure link of network 1755 from, for example, an image warehouse or studio 1750. Multiple other projectors (e.g., at theaters around the globe, 1760! . . . $1760_n$,) may also feed from similar network or other electronic or wireless connections including wireless networks, satellite transmission, or quality airwave broadcasts (e.g., High Definition or better broadcast). The server 1780 includes color correction module 1775 that performs mathematical transformations of color to be reproduced by the projector prior to image projection. The mathematical transformations utilize image data for each of the left and right channels and transform them into parameters consistent with the primary colors or passbands of the corresponding left or right channel filter. The mathematical transformation, or color corrections, adjust the hue of each image and maximize the available color space and match the color space and white point of projector 1705 as closely as possible. The amount of color correction required when using the invention is significantly reduced when compared with conventional spectral separation.

Figure 17B:
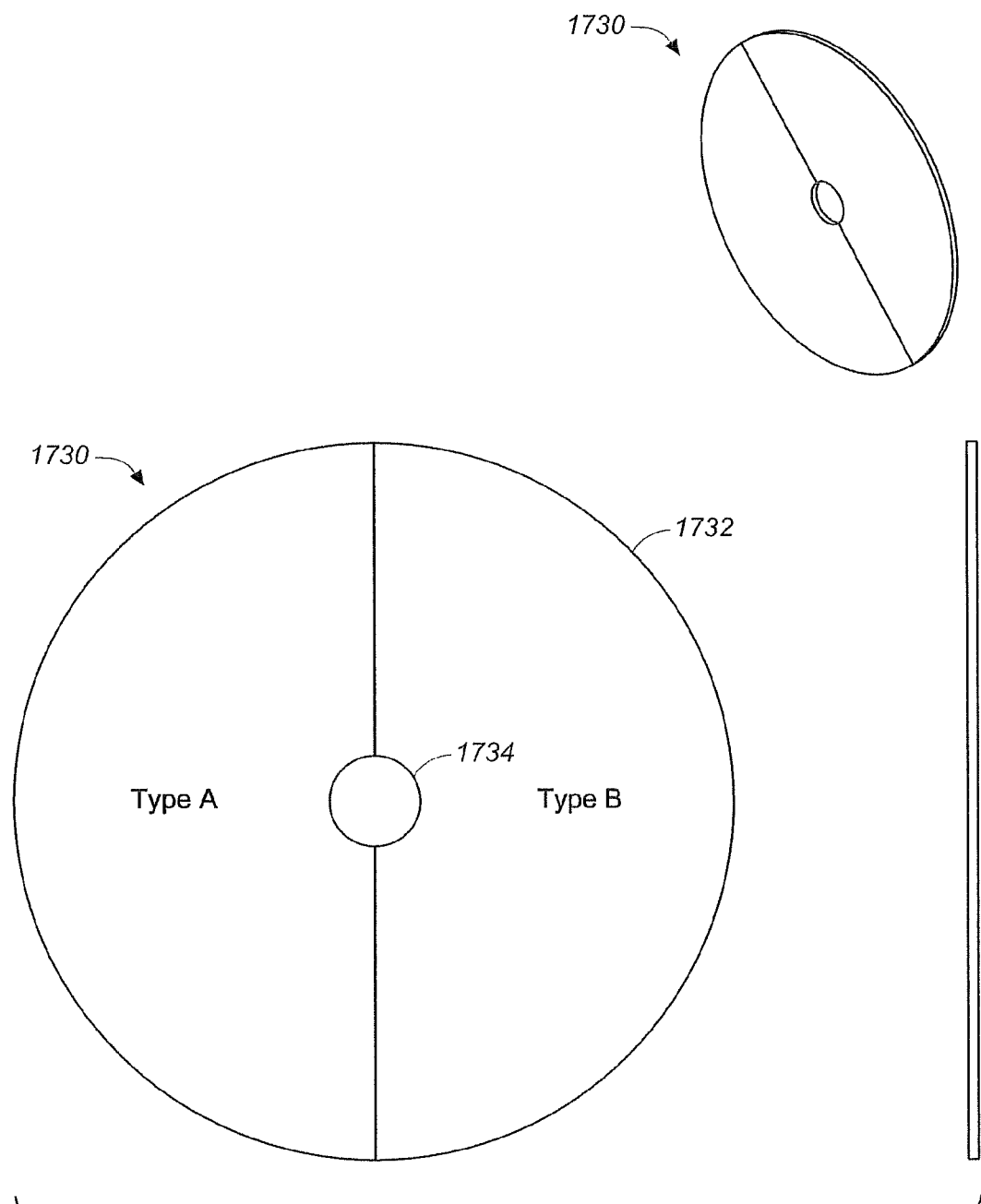
FIG. 17B is a drawing of a filter wheel.

The color corrected 3D content is transmitted to projector 1705. The 3D content includes left and right channel images that switch at a rate fast enough that they blend into a single 3D image when viewed by a viewer through glasses 1715. At some point in the optical path of the projection system, filters according to the present invention are utilized. For example, a filter wheel 1730 is placed at point in the optical path closer to the light source. FIG. 17B provides an illustrative example of a filter wheel 1730 in front, side, and angle views. Specifications for appropriate physical dimensions and characteristics of the exemplary filter wheel 1730 include, for example: an outside diameter (OD) 1732 of 125.00 mm+/−0.15 mm, an inside hole 1734 with a diameter (ID) of 15.08 mm+/−0.04 mm (that is, for example, off-center by not more than 0.075 mm), and a thickness of 1.00 mm-1.20 mm. The exemplary filter wheel includes, for example, Material: Borofloat or Fused Silica. Monolithic Filter, 2 Section (e.g., TYPE A, a first channel filter, and TYPE B, a second channel filter), Max 3 mm Undefined Transition, Clear Aperature: 1 mm From OD, 10 mm From ID, Surface Quality: 80-50 Where Scratch Number is Width Measured In Microns, Edge Finish: As Fabricated, Edge Chips: Less Than Or Equal To 1 mm. All such specifications are exemplary and other combinations of materials, dimensions, and/or construction techniques, etc, may be utilized. Alternatively, an electronically switched filter 1725 is placed, for example, after the projection lens 1720.

A controller 1735 provides signals that maintain synchronization between the filter 1730 and the image being projected. For example, features of a left channel filter according to the present invention are active when a left channel image is being projected, and features of a right channel filter according to the present invention are active when a right channel image is being projected. In the electronically switched filter case, the controller signals switching between left and right channel filters in synchronicity with the left and right image projections. In the filter wheel embodiment, for example, the controller maintains a rotational speed and synchronicity between the left and right channel images and the left and right channel filters respectively. The blended image as viewed through glasses 1710 has a color space and white point that closely matches a color space and white point of projector 1705 without filter 1730. The present invention includes an embodiment in which a filter wheel having left and right channel projection filters disposed thereon is placed inside a movie projector between the light source and integrating rod of the movie projector. The advantage of this placement is that the amount of light passing through the remaining optical components is reduced and less likely to overload sensitive electronics or other components (e.g. DLP, LCOS, or other light processors or light valves in the projector), but the amount of light that exits the projection system is equivalent to embodiments where the projection filter(s) is placed further downstream locations. Alternatively, the power of the light source can be increased resulting in increased output without jeopardizing the integrating rod or other downstream components. Further advantages to the described placement of the filter is that the filter can be made smaller than at most other points in the light patch, and at a reduced cost compared to larger filters. And, images formed after filtering are generally found to be sharper than images formed and then filtered.

In one embodiment, the projection filter is a filter wheel where approximately ½ the wheel has filter characteristics of a left channel filter according to the present invention and approximately ½ the wheel has filter characteristics of a right channel filter according to the present invention. Table 1 specifies an exemplary filter wheel specification for a multi-band filter having a left channel filter section and right channel filter section. The Delta values shown in Table 1 specify a slope (steepness) of the band edges. The T50 values specify the wavelength at the band edge where the light transmission is 50%. At the band pass wavelengths the transmission is at least 90%, and at the band reject wavelengths the transmission is less than 0.5%. The wheel may have, for example a diameter of approximately 125 mm diameter which is well suited for installation in a D-Cinema projector (e.g., projector 705) between the light source and integrating rod.

TABLE 1

Exemplary Filter Wheel Specification

| Delta T$_{0.5}$ T = 0.5% | Delta T$_{90}$ T = 90% | Right T = 50% | Left T = 50% |
|---|---|---|---|
| — | — | ↑<430 nm | |
| <8 nm | <2 nm | ↓440 nm +− 2.5 nm | |
| <8 nm | <2 nm | | ↑456 nm +− 2 nm |
| <8 nm | <2 nm | | ↓470 nm +− 2.5 nm |
| <8 nm | <2.5 nm | ↑484 nm +− 2.5 nm | |
| <10 nm | <3 nm | ↓498 nm +− 3 nm | |
| <10 nm | <3 nm | ↑511 nm +− 3 nm | |
| <10 nm | <2.5 nm | ↓526 nm +− 2.5 nm | |
| <10 nm | <2.5 nm | | ↑538 nm +− 2.5 nm |
| <10 nm | <3 nm | | ↓554 nm +− 2.5 nm |
| <10 nm | <3 nm | ↑568 nm +− 2.5 nm | |
| <12 nm | <3 nm | ↓584 nm +− 3 nm | |
| <12 nm | <3 nm | ↑610 nm +− 3 nm | |
| <12 nm | <3 nm | ↓621 nm +− 3 nm | |
| <12 nm | <3 nm | | ↑635 nm +− 3 nm |
| — | — | | ↓>690 nm |

The above exemplary specifications include some pre-blue-shifting consistent with the above-cited Richards et al patent application. However, inclusion of blue-shifting and other features is not required.

Table 2 specifies an exemplary set of viewing filters matching (or encompassing the passbands of the projector filters but also including a small amount of red shift). The filters include a multi-band filter for the left channel (or left eye lens) and a multi-band filter for the right channel (or right eye lens). The Delta values specify the slope (steepness) of the band edges. The T50 values specify the wavelength at the band edge where the light transmission is 50%. At the band pass wavelengths the transmission is at least 90%, and at the band reject wavelengths the transmission is less than 0.5%. These filters are, for example, placed on left and right lenses of glasses 1715.

TABLE 2

Exemplary Viewing Filters

| Delta T$_{0.5}$ T = 0.5% | Delta T$_{90}$ T = 90% | Right T = 50% | Left T = 50% |
|---|---|---|---|
| — | — | ↑<430 nm | |
| <12 nm | <3 nm | ↓442 nm +− 3 nm | |
| <12 nm | <3 nm | | ↑458 nm +− 3 nm |
| <12 nm | <3 nm | | ↓472 nm +− 3 nm |
| <16 nm | <4 nm | ↑486 nm +− 3 nm | |
| <16 nm | <4 nm | ↓528 nm +− 3 nm | |
| <16 nm | <4 nm | | ↑540 nm +− 3 nm |
| <16 nm | <4 nm | | ↓557 nm +− 3 nm |
| <20 nm | <5 nm | ↑571 nm +− 3 nm | |
| <22 nm | <6 nm | ↓624 nm +− 4 nm | |
| <23 nm | <6 nm | | ↑637 nm +− 5 nm |
| — | — | | ↓>700 nm |

Figure 18:
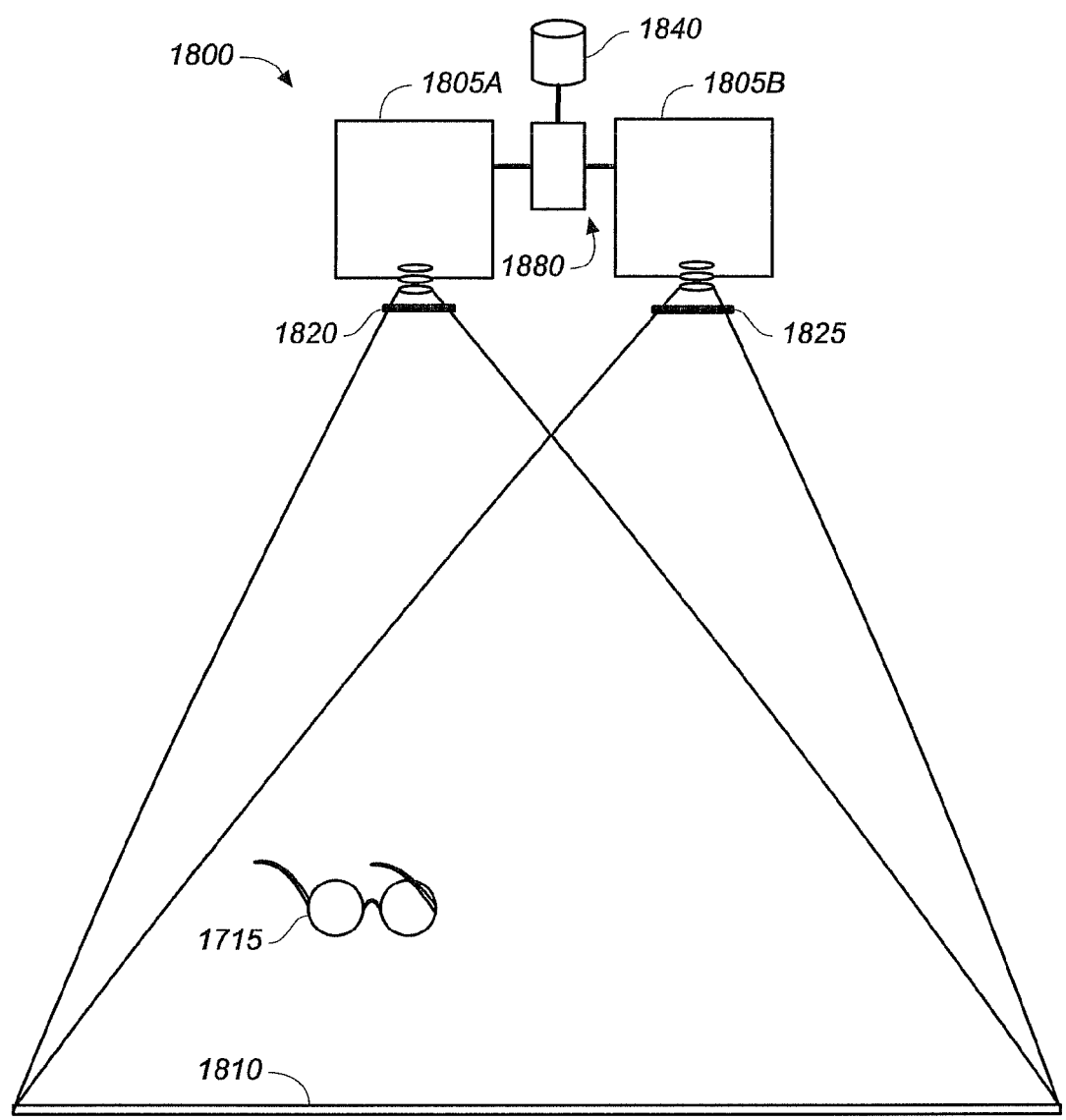
FIG. 18 is a drawing of a fixed filter arrangement in a two projector system.

FIG. 18 is a drawing of a fixed filter arrangement in a two projector system 1800 according to an embodiment of the present invention. Left and right channel images are derived, decoded, retrieved, or reconstructed from data stored on disk drive 1840 (or received from an appropriate network or transmission reception) by server 1880. Color correction as described above may also be applied (not shown).

The decoded, color corrected (if applicable), left and right channel images are then projected simultaneously from left and right channel projectors 1805A and 1805B onto screen 1810 for viewing through glasses 1715. A right channel filter 1820A having passband characteristics as described above is used to filter the projected right channel image. A left channel filter 1820B having passband characteristics as described above is used to filter the projected left channel image. The right and left channel filters are fixed filters (e.g., filters with characteristics that do not change with time), and are constructed, for example, from a clear substrate (e.g., glass) coated with appropriate layers to produce the passbands for the desired left or right channel filter characteristics. The fixed filter may be located in the projector at any point in the optical path, or may be located outside the projector past the projection lens as shown in FIG. 18.

Although the present invention has been mainly described as increasing color space by increasing the number of passbands in the blue and green wavelengths (and interleaving those passbands between the left and right channels), the invention should not be limited to increasing the number of passbands in the same number or in the same wavelengths as specifically described herein, and, should include any number of increased passbands at any wavelength capable of being passed by the projection filter. For example, instead of dividing the blue primary into three sub-parts (2 subparts in one channel and one part in the other channel); the blue primary may be divided into four or more sub-parts (e.g., 3 sub-parts in one channel and 2 sub-parts in the other channel). Further, division of sub-parts as described herein may be performed at any of the available wavelengths and can therefore be extended into the red wavelengths. Further yet, discussion above should not be viewed to limit implementations of wherein the additional sub-parts of the blue and green bands are necessarily in the same channel, as the invention can be practiced by having two sub-parts of blue in a first channel, one sub-part of blue in a second channel, two sub-parts of green in the second channel, and one sub-part of green in the first channel. The same also logically extends to embodiments with more than three sub-parts where the additional subparts may be in any of the color bands and any of the channels.

In yet another example, the recitations regarding curved glass lenses having a 50 mm radius of curvature is exemplary and any other radii could be utilized so long as the radius does not extend toward infinity (making the glasses flat, or essentially flat). For example a 40 mm radius or an 80 mm radius or more (e.g., even up to 200 mm) may provide suitable alternatives and not detract an unacceptable amount from the benefits of the described 50 mm radius of curvature. In one embodiment, a radius of curvature of the glass lenses is 90 mm (alternatively, approximately 90 mm) which represents an acceptable trade-off considering the cost and difficulty of coating lenses with a greater amount of curvature without detracting too substantially from the benefits of optimally curved lenses.

Various non-limiting and exemplary embodiments of the invention are now described, including, for example, viewing glasses comprising a non-flat substrate (e.g., non-flat lenses), with spectrally complementary filters (alternatively, the filters are for two channels such that the filter of a first channel passes light bands of the first channel and blocks light bands of the second channel and visa-versa). The viewing glasses may comprise, for example, a first lens having a first spectral filter, and a second lens having a second spectral filter complementary to the first spectral filter, and the first and second lenses are each curved to reduce a wavelength shift that occurs when viewing an image at other than a normal angle through the lens. In various embodiments, the curve of each lens comprises, for example, any of: a radius centered on the viewers pupil, a radius centered behind the viewers pupil, a non-spherical shape, a cylindrical shape, includes multiple radii, a predetermined mathematical function, prescription curvatures. In one embodiment, the spectral filters have a thickness that varies by location on the lens. In another embodiment, the spectral filters comprise a plurality of dielectric layers, and the dielectric layers have an increased layer thickness toward edges of the lenses. In another embodiment, the present invention comprises viewing filters comprising a non-flat substrate and spectrally complementary filters. In one embodiment, at least one of the spectrally complimentary filters comprises, for example, a single passband configured to pass two lightbands of different colors. In one embodiment, at least one of the spectrally complimentary filters comprises a single passband configured to pass two different colors of light. In one embodiment, the spectrally complimentary filters are configured for viewing a 3D display, which, for example, may comprise a reflection off a cinema screen. In one embodiment, the spectrally complimentary filters comprise, for example, a first filter having a set of primary passbands comprising, a first passband configured to pass both a green lightband and a red lightband, and a second passband configured to pass both a blue lightband and a green lightband. In one embodiment, the spectrally complimentary filters comprise, a first filter comprising a first set of primary passbands comprising a passband configured to pass both a green lightband and a red lightband, and a second filter comprising a second set of primary passbands comprising a passband configured to pass both a blue lightband and a green lightband. In one embodiment, the spectrally complimentary filters comprise a first filter having a set of 3 passbands configured to pass a set of more than 3 primary color lightbands. In one embodiment, the spectrally complimentary filters comprise a first filter comprising a first set of passbands configured to pass a first set of primary lightbands and a second filter comprising a second set of passbands configured to pass a second set of primary lightbands, wherein the first set of primary lightbands are mutually exclusive to the second set of primary lightbands. Additionally, the first set of passbands and the second set of passbands may be, for example, separated by guard bands having a width calculated to maintain separation between the primary lightbands when viewed through the viewing filters and compensate for blue shift due to a viewing angle of the primary lightbands through the viewing filters. In one embodiment, at least one of the passbands encompasses at least two of the primary lightbands.

In another embodiment, the invention comprises spectral separation viewing glasses, comprising, a first lens comprising a first spectral filter, and a second lens comprising a second spectral filter complementary to the first spectral filter, wherein the first spectral filter and the second spectral filter have at least one guard band between adjacent portions of spectrum of the spectral filters, and the guard band bandwidth is calculated based on an amount of blue shift occurring when viewing portions of the spectrally separated images at an angle through the lenses. In one embodiment, the guard band has a bandwidth sufficient to reduce crosstalk of spectrally separated images viewed through the glasses. The guard band comprises, for example, approximately 2% or more of a wavelength of a crossover point of adjacent portions of the spectral filters.

In another embodiment, the invention comprises a spectral separation viewing system, comprising, viewing glasses, comprising a first lens having a first spectral filter, and a second lens having a second spectral filter complementary to the first spectral filter, wherein the spectral filters include a guard band between adjacent portions of spectrum of the first and second lenses, and the lenses have a curvature configured to cause angles of incidence of light at edges of the lenses to be closer to normal when compared to flat lenses. The curvature of the lenses are, for example, spherical. In one embodiment, the spectral filters are not uniform across the lenses. In various other embodiments, the viewing system further comprises, for example, a projection system configured to project first and second spectrally separated images, and the first and second spectrally separated images are each respectively viewed through the spectral filters of the viewing glasses. The viewing system may also further comprise, for example, a plurality of pairs of said viewing glasses, each pair of viewing glasses being assigned to an individual viewer in a movie theater audience, and the first and second filters are disposed on lenses of each pair of glasses.

In yet another embodiment, the invention comprises a method, comprising the steps of, projecting first and second spectrally separated images onto a display screen, viewing the projected images through a pair of glasses having a first lens having a first spectral filter designed to be used with the first spectrally separated image and a second lens having a second spectral filter designed to be used with the second spectrally separated image, and wherein the spectral filters are configured to have an amount of wavelength shift effect depending upon a viewing angle through the lens. In one embodiment, adjacent portions of spectrum of the first and second spectral filters are separated by a guard band comprising a bandwidth calculated for a central viewing location and sufficient to eliminate crosstalk for normal viewing from edges of the display screen. In yet another embodiment, the spectral filters comprise a plurality of guard bands each separating a different set of adjacent spectrums in the first and second filters, and a bandwidth of each guard band is determined based on a function of a crossover wavelength of the adjacent spectrums and a viewing angle to an edge of the display screen. The display screen is, for example, a cinema movie screen.

In yet another embodiment, the present invention comprises a 3D viewing system, comprising means for projecting spectrally separated images, means for viewing the spectrally separated images through different ocular channels, and means for compensating for wavelength shifts occurring due to viewing angles to portions of the images. In one embodiment, the means for compensating includes, for example, means for adjusting an amount of spectral filtering performed based on viewing angle. In another embodiment, the means for compensating includes, for example, means for producing a wavelength mismatch between projector filters used to project the spectrally separated images and eye filters used to view the spectrally separated images, wherein the mismatch compensates for an amount of wavelength shift that occurs in the eye filters due to light incident upon the eye filters at non-normal angles. In yet another embodiment, the present invention comprises a viewing system, comprising shaped glasses comprising a pair of left and right spectrally complementary filters respectively disposed on left and right curved lenses of the glasses, and a display system configured to display spectrally separated left and right images respectively configured to be viewed through the left and right complimentary filters, wherein each spectrally separated image comprises at least one light bandwidth approximately matching at least one pass band of its corresponding filter. The display system further comprises, for example, a projector configured to display the spectrally separated left and right images with a pre-determined amount of pre-blue shift. In one embodiment, the spectrally complementary filters comprise guard bands between adjacent spectrums of the spectrally complementary filters. The shaped glasses of the viewing system, are, for example, utilized to view color shifted projections of spectrally complementary images. In one embodiment, the shaped glasses of the viewing system include frame temples and a bridge designed to flex implementing an adjustable dihedral angle between the lenses.

An amount of the dihedral angle change due to flexing is, for example, approximately 5 degrees.

In yet another embodiment, the present invention comprises a method, comprising the steps of, distributing shaped glasses to audience members; and projecting first and second spectrally complementary images on a display screen within view of the audience members, wherein the shaped glasses comprise first and second shaped lenses having first and second spectrally complementary filters respectively disposed thereon, and the first and second spectrally complementary filters respectively correspond in bandwidth to the projected first and second spectrally complementary images. In one embodiment, the bandwidth correspondence of the first spectrally complimentary filter passes colors in a first channel of a projection and blocks colors in a second channel of the projection, and the bandwidth correspondence of the second spectrally complimentary filter passes colors in a second channel of a projection and blocks colors in a first channel of the projection. In yet another embodiment, the present invention comprises a storage medium having a visual performance stored thereon, that, when loaded into a media player coupled to a display device, causes the media player to transmit the visual performance for display to the display device, wherein the visual performance comprises spectrally separated images configured to be viewed respectively through independent ocular channels using curved spectrally separated filters. The storage medium is, for example, prepackaged with at least one pair of glasses having curved lenses upon which the curved spectrally separated filters are disposed. The spectrally separated images are, for example, displayed by the display device using filters that are blue shifted compared to filtering that occurs through normal angle viewing of the curved spectrally separated filters. The spectrally separated images are, for example, separated by a guard band configured to compensate for spectra mismatch between the projected images and properties of filters used to view the projected images. The combination of pre-blue shifting, curved lenses, and guard bands effectively eliminates crosstalk when viewing the images.

In yet another embodiment, the present invention comprises, for example, a system for viewing 3D images, comprising, serving 3D content over a network to a receiving electronic device, projecting the 3D content to a display device, wherein the 3D content comprises spectrally complementary images intended to be viewed with shaped glasses. The receiving electronic device comprises, for example, a display system located at a movie theater. In one embodiment, the projected 3D content is projected with a predetermined amount of blue-shift.

In yet another embodiment, the present invention comprises a method of displaying an 3-D image, comprising the steps of, projecting left and right filtered images onto a screen, and filtering the left and right images for each of spectrally specific properties corresponding to the image prior to display on the screen, wherein the filtering is performed with a filter having characteristics that are shifted an amount configured to compensate for a wavelength shift that occurs when a viewer watches the screen. The wavelength shift comprises, for example, a blue-shift that occurs due to viewing angles (which may be, for example, a blue-shift that occurs in characteristics of an eye filter used to view the images, or, as another example, a blue-shift occurring in filtered viewing glasses when viewing any of the images through the filtered viewing glasses at other than a normal angle). The spectrally specific properties corresponding to the image comprise, for example, a set of wavelengths corresponding to the right images and a complimentary set of wavelengths corresponding to the left images.

In yet another embodiment, the present invention comprises a projector filter, comprising, a first filter having a first set of primary passbands, and a second filter having a second set of primary passbands, wherein the first set of primary passbands has a different number of primary passbands than the second filter. In one embodiment, the first filter has, for example, at least two blue primary passbands and the second filter has at least one blue primary passband. In another embodiment, the first filter has, for example, at least two green primary passbands and the second filter has at least one green primary. In another embodiment, the first filter has, for example, two blue primaries and two green primaries and the second filter has one blue primary and one green primary. In another embodiment, the first filter has, for example, passband wavelengths of approximately 400 to 440 nm and 484 to 498 nm, 514 to 528 nm, 567 to 581 nm, and 610 to 623 nm. The second filter has, for example, passband wavelengths of approximately 455 to 471 nm, 539 to 556 nm, and 634 to 700 nm. The passband wavelength specifications have a tolerance of, for example, approximately +−5 nm. In one embodiment, the primary passbands of the first filter excludes wavelengths passed by the second filter. In one embodiment, the primary passbands of the filters are selected to maximize reproduction of a color space of a projector. The projector color space is, for example, the color space of a D-Cinema projector. In one embodiment, the the projector filter is an electronically switchable filter that switches between the first and second filters according to an image synchronization signal.

In yet another embodiment, the present invention comprises a system for projection of spectrally separated 3D images, comprising, a projection system configured to project left and right channel images for display by a viewer, a filter placed in at least one light path of the projection system comprising a left channel filter and a right channel filter, wherein at least one of the left and right channel filters has more than 3 primary passbands. In one embodiment, one of the left and right channel filters has at least 2 primary passbands in blue wavelengths. In one embodiment, one of the left and right channel filters has at least 2 primary passbands in green wavelengths. In one embodiment, one of the left and right eye channel filters has at least 2 primary passbands in blue wavelengths and at least 2 primary passbands in green wavelengths. In one embodiment, the primary passbands of the filters are selected to maximize reproduction of a color space of the projection system in images projected by the projection system. In one embodiment, the system further comprises a color correction module configured to color correct images projected by the projection system according to a color space of the filters. Alternatively, the color correction module is configured to color correct images based on a color space of light passed by the filter.

In yet another embodiment, the present invention comprises a pair of projector spectral separation filters configured to divide a blue projector primary into three sub-parts, a green projector primary into three sub-parts, and a red projector primary into to two sub-parts. One of the filters has, for example, two passbands in blue, two passbands in green, and a single passband in red, and the other filter has one passband in blue, one passband in green, and one passband in red. In another embodiment, One of the filters has, for example, two passbands in blue, two passbands in green, and only one passband in red, and the other filter has only one passband in blue, only one passband in green, and only one passband in red. In one embodiment, one of the filters has, for example, two passbands in blue, one passband in green, and one passband in red, and the other filter has one passband in blue, two passbands in green, and one passband in red. In another embodiment, one of the filters has, for example, two passbands in blue, only one passband in green, and only one passband in red, and the other filter has only one passband in blue, two passbands in green, and only one passband in red. In one embodiment, one of the filters has one passband in blue, two passbands in green, and one passband in red, and the other filter has two passbands in blue, one passband in green, and one passband in red. In another embodiment, one of the filters has only one passband in blue, two passbands in green, and only one passband in red, and the other filter has two passbands in blue, only one passband in green, and only one passband in red. In one embodiment, the sub-part passbands are located to achieve a substantial match to an original color space and white point of an unfiltered D-Cinema projector.

In yet another embodiment, the present invention comprises, for example, a set of color filters, comprising, a first filter having a first set of primary color passbands, a second filter having a second set of primary color passbands of different wavelengths compared to the first set of primary colors, wherein the first filter has more than one primary color in at least one color band. The filter set is embodied, for example, as an electronically switchable filter set. In one embodiment, the color filter set is part of a 3D projection system and the primary passbands of the first and second filters are selected to maximize reproduction of a color space of the 3D projection system without the first and second filters. In yet another embodiment, the present invention comprises, for example, a method, comprising the steps of, preparing a 3D image comprising a left image and a right image, filtering the left image with a left channel filter, filtering the right image with a right channel filter, and projecting the left and right filtered images onto a screen, wherein at least one of the left channel filter and right channel filter have more than 3 primary passbands. One of the left and right channel filters comprises, for example, 2 primary passbands in blue wavelengths and 2 primary passbands in green wavelengths. In one embodiment, the method further comprises, for example, a step of viewing the projected 3-D image through left and right viewing filters having passbands that respectively exclude passbands of the right channel filter and the left channel filter. In another embodiment, the method further comprises, for example, a step of switching the left and right channel filters in synchronicity with the projection of left and right channel images of the 3D image.

In yet another embodiment, the present invention comprises, for example, a 3D viewing system comprising a first asymmetric filter set comprising a projection filter and a viewing filter. In one embodiment, the 3D viewing system may further comprise, for example, a second asymmetric filter set wherein the first asymmetric filter set, is positioned in an optical path of the system and configured to pass wavelengths of a first channel of the system and the second filter set is configured to pass wavelengths of a second channel of the system. In another embodiment, the viewing filter includes passbands that encompass passbands of the projection filter. In yet another embodiment, the viewing filter includes, for example, passbands that approximately encompass passbands of the projection filter; and the passbands of the projection filter are blue-shifted compared to the passbands of the viewing filter. In yet another embodiment, the present invention comprises an asymmetric filter system, comprising, a first set of filters comprising a first set of optical passbands, a second set of filters comprising a second set of optical passbands different from the first set of optical passbands and encompassing the first set of optical passbands. In one embodiment, the first set of filters is upstream in an optical path relative to the second set of filters. In another embodiment, the first set of filters comprise a projection filter and the second set of filters comprise a viewing filter. In another embodiment, the first set of optical passbands comprises a right channel set of optical passbands and a left channel set of optical passbands that exclude any portion of the right channel set of optical passbands. In another embodiment, the second set of optical passbands include a left channel set of optical passbands and a right channel set of optical passbands that exclude any portion of the left channel optical passbands.

In yet another embodiment, the present invention comprises a method, comprising the steps of, providing a theater audience with a pair of 3D viewing glasses comprising left and right lenses respectively comprising left and right viewing filters, and projecting left and right images onto a display screen using left and right projection filters, wherein the left projection filter and the left viewing filter comprise a first asymmetric filter set and the right projection filter and the right viewing filter comprise a second asymmetric filter set. In one embodiment, a total number of passbands in the viewing filters is less than a total number of passbands in the projection filters. In one embodiment, the projector filters comprise passbands that divide blue light wavelengths into at least three blue sub-parts and that divide green wavelengths into at least two green sub-parts. In one embodiment, a viewing filter in one of the asymmetric filter sets comprises a passband that encompasses wavelengths in the longest wavelength blue sub-part and wavelengths in a green sub-part. In one embodiment, the projector filters comprise passbands that divide green light wavelengths into at least three sub-parts and divide red light into at least two red sub-parts, and a viewing filter in one of the asymmetric filter sets comprises a passband that encompasses a longest wavelength green sub-part and a red sub-part. In one embodiment, the projector filters comprise passbands that divide blue light wavelengths into at least three sub-parts and green light wavelengths into at least three sub-parts, and a viewing filter in one of the asymmetric filter sets comprises a passband that encompasses a longest wavelength blue sub-part and a shortest wavelength green sub-part. In one embodiment, the projector filters comprise passbands that divide green light wavelengths into at least three sub-parts and red light wavelengths into at least three sub-parts, and a viewing filter in one of the asymmetric filter sets comprises a passband that encompasses a longest wavelength green sub-part and a shortest wavelength red sub-part. In one embodiment, each viewing filter comprises, three passbands exclusively comprising one passband including blue wavelengths, one passband including green wavelengths, and one passband including red wavelengths. In one embodiment, the projector filters comprise 3 passbands each in green and blue light wavelengths and two passbands in red wavelengths. In one embodiment, the viewing filters each exclusively comprises three passbands, one passband of blue wavelengths, one passband of green wavelengths, and one passband of red wavelengths. Other exemplary embodiments have been provided throughout the present disclosure. In yet another embodiment, the present invention comprises a filter configurable in an eyewear device of a spectrally separated 3D viewing system, comprising a set of passbands and blocking bands configured to pass light wherein at least one of the passbands is capable of passing bands of 2 different colors of light and the blocking bands are configured to block light in at least one band of light in each of the 2 different colors. In one embodiment, the passband capable of passing bands of 2 different colors of light does not pass light in a third color. In one embodiment, the bands of 2 different colors of light are separated by a notch. The notch is, for example, a band (a notch band) not utilized by the 3D viewing system for light transmission. In one embodiment, the notch band is, for example, relatively narrow compared to the bands of 2 different colors of light. In another embodiment, the notch band bandwidth is similar to a bandwidth of at least one of the bands of 2 different colors of light. In one embodiment, the notch band encompasses a transition from wavelengths of a first of the 2 different colors of light to wavelengths of a second of the two different colors of light. In one embodiment, the 2 different colors of light comprise blue light and green light and the third color comprises red. In one embodiment, the 2 different colors of light comprise red light and green light and the third color comprises blue. In one embodiment, the filter is disposed on a curved substrate. In one embodiment, the filter is disposed on a curved substrate having a radius of approximately 90 mm. In one embodiment, the filter is disposed on a curved lens having a radius of approximately 40 mm to 200 mm.

In one embodiment, the present invention comprises a filter comprising only 3 mutually exclusive passbands of visible light, a first passband configured to pass only a first color of light, a second passband configured to pass 2 spectrum adjacent colors of light comprising the first color of light and a second color of light, and a third passband configured to pass 2 spectrum adjacent colors of light comprising the second color of light and a third color of light. In one embodiment, the first second and third colors of light are, for example, blue, green, and red, respectively. In another embodiment, the first, second, and third colors of light are red, green, and blue, respectively. The filter is, for example, disposed on a lens configurable as a channel filter in a pair of 3D viewing glasses.

In describing the preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner.

For example, when describing a projector filter, any other equivalent device or device having an equivalent function or capability, whether or not listed herein, may be substituted therewith. In another example, when describing a dielectric layer, any other material used as filter and exhibiting a substantive wavelength shift (e.g., nano-material coatings), whether used alone or in combination with others so as to have an equivalent function or capability, whether or not listed herein, may be substituted therewith. In another example, a flexible bridge piece may be substituted with any mechanism suitable to adjust a dihedral angle of the lens, including a ratchet mechanism, spring loaded stops, etc. In yet another example, lenses according to the present invention may be constructed of glass, plastic, or any other such material providing the appropriate shapes as described above.

Furthermore, the inventors recognize that newly developed technologies not now known may also be substituted for the described parts and still not depart from the scope of the present invention. All other described items, including, but not limited to lenses, layers, filters, wheels, screens, display devices, passbands, coatings, glasses, controllers, projectors, display screens, networks or other transmission capabilities, etc should also be considered in light of any and all available equivalents.

The present invention may suitably comprise, consist of, or consist essentially of, any of element (the various parts or features of the invention) and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

Portions of the present invention may be conveniently implemented using a conventional general purpose or a specialized digital computer or microprocessor programmed according to the teachings of the present disclosure, as will be apparent to those skilled in the computer art (e.g., controlling an electronically switched pre-blue shift projection filter).

The present invention includes a computer program product which is a storage medium (media) that includes, but is not limited to, any type of disk including floppy disks, mini disks (MD's), optical discs, DVD, HD-DVD, Blue-ray, CD-ROMS, micro-drive, and magneto-optical disks. ROMs, RAMs. EPROMs, EEPROMs, DRAMs, VRAMs, flash memory devices (including flash cards, memory sticks), magnetic or optical cards. SIM cards, MEMS, nanosystems (including molecular memory ICs), RAID devices, remote data storage/archive/warehousing, or any type of media or device suitable for storing instructions and/or data. The present invention includes software for controlling aspects of the present invention including, for example, switching of pre-blue shifted filters or performance of color correction stored on any computer readable medium (media).

In addition, such media may include or exclusively contain content prepared or ready for display according to the present invention. Such content is, for example, read from the media and then transmitted electronically over a network, broadcast over the air, or transmitted by wire, cable or any other mechanism. Ultimately, the content of such media may be provided to a display device and then viewed in accordance with one or more aspects of the invention. The content is, for example, prepared or optimized so as to project images having bandwidths optimized for the display and viewing processes described herein. Such media may also be packaged with glasses and/or filters prepared according to one or more of the various aspects of the invention as described above.

The present invention may suitably comprise, consist of, or consist essentially of, any of element (the various parts or features of the invention, e.g., shaped lenses, varying dielectric layer thicknesses, pre-shifting projected or displayed images, etc., and/or any equivalents. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed is:

1. Glasses enabling a user to view color 3D images transmitted as a pair of images, each image being formed from light in at least three different wavelength bands, one red, one green, and one blue, each of the wavelength bands of one image being outside of each of the wavelength bands of the other image, and each wavelength band extending between its respective shortest and longest wavelengths, the glasses comprising,
    a first eye lens interference filter having spectral properties comprising a set of at least three visible light pass wavelength areas each light pass wavelength area configured to pass one of the red, blue and green wavelength bands of one of said images;
    a second eye lens interference filter having spectral properties comprising a second set of at least three visible light pass wavelength areas each light pass wavelength area configured to pass one of the red, green and blue wavelength bands of the other of said images,
    wherein, at the center area of the eye lens filter and with respect to light normal to the surface of the eye lens filter, the longest wavelength of at least one light pass wavelength area in each of said filters is shifted to a longer wavelength relative to the light wavelength band that passes through it such that the longest wavelength of that light pass wavelength area is at a longer wavelength than the longest wavelength of the light wavelength band that passes through that light pass wavelength area.

2. The glasses according to claim 1, wherein the spectral properties of the filters are different at an edge of each lens compared to a central area of the lens.

3. The glasses according to claim 2, wherein the spectral properties are red shifted at an edge of each lens compared to a central area of the lens.

4. The glasses according to claim 2, wherein the spectral properties shift toward longer wavelengths as a surface of a lens is traversed from the central area to an edge of the lens.

5. The glasses according to claim 2, wherein the filters comprise at least one notch filter.

6. The glasses according to claim 2, wherein the filters comprise a plurality of notch filters.

7. The glasses according to claim 2, wherein the filters comprise at least one blocking filter.

8. The glasses according to claim 2, wherein the glasses are distributed to viewers and utilized in conjunction with a 3D imaging system at a venue displaying cinema content using a plurality of digital cinema projectors.

9. Glasses according to claim 1 enabling a user to view 3D images, the glasses comprising two lenses, each lens comprising a filter having light pass wavelength areas with spectral properties configured to pass a plurality of light wavelengths for creating the 3D images, wherein a curvature of the lenses and said shift of at least one spectral property of a light pass wavelength area relative to wavelengths passed by the light pass wavelength area when viewed normally reduce an effect of viewing angle related shifts of the light pass wavelength area spectral properties.

10. Glasses enabling a user to view color 3D images transmitted as a pair of images, each image being formed from light in at least three different wavelength bands, one red, one green, and one blue, each of the wavelength bands of one image being outside of each of the wavelength bands of the other image, and each wavelength band extending between its respective shortest and longest wavelengths, the glasses comprising, a first eye lens interference filter having spectral properties comprising a set of at least three visible light pass wavelength areas each light pass wavelength area configured to pass one of the red, blue and green wavelength bands of one of said images;

a second eye lens interference filter having spectral properties comprising a second set of at least three visible light pass wavelength areas each light pass wavelength area configured to pass one of the red, green and blue wavelength bands of the other of said images, wherein, at the center area of the eye lens filter and with respect to light normal to the surface of the eye lens filter, the longest wavelength of at least one light pass wavelength area in each of said filters is at a longer wavelength than the longest wavelength of the light wavelength band that passes through that light pass wavelength area.

11. The glasses according to claim 10, wherein the first and second eye lens filters comprise guard bands blocking transmission between light pass wavelength areas of that eye lens filter and light pass wavelength areas of the other eye lens filter.

12. The glasses according to claim 10, wherein—the spectral properties of the eye lens filters vary from one location of a filter to another location of the same filter.

13. The glasses according to claim 12, wherein the filters are curved, and a combination of the variance in spectral properties and curvature counteract adverse viewing effects caused by viewing the 3D images at a an off-normal angle of incidence away from a central area of the filters.

14. The glasses according to claim 12, wherein the variance comprises a smooth variance of filter properties causing a continuous shift toward longer wavelengths toward edges of the filters.

* * * * *